United States Patent
Ozcan et al.

(10) Patent No.: US 11,915,360 B2
(45) Date of Patent: Feb. 27, 2024

(54) VOLUMETRIC MICROSCOPY METHODS AND SYSTEMS USING RECURRENT NEURAL NETWORKS

(71) Applicant: THE REGENTS OF THE UNIVERSITY OF CALIFORNIA, Oakland, CA (US)

(72) Inventors: Aydogan Ozcan, Los Angeles, CA (US); Yair Rivenson, Los Angeles, CA (US); Luzhe Huang, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 117 days.

(21) Appl. No.: 17/505,553

(22) Filed: Oct. 19, 2021

(65) Prior Publication Data

US 2022/0122313 A1    Apr. 21, 2022

Related U.S. Application Data

(60) Provisional application No. 63/094,264, filed on Oct. 20, 2020.

(51) Int. Cl.
*G06T 15/08* (2011.01)
*G06F 18/214* (2023.01)
*G06N 3/08* (2023.01)

(52) U.S. Cl.
CPC ........... *G06T 15/08* (2013.01); *G06F 18/214* (2023.01); *G06N 3/08* (2013.01)

(58) Field of Classification Search
CPC ...... G06V 10/82; G06V 20/69; G06V 20/693; G06N 3/08; G06N 3/045; G06N 3/047;

(Continued)

(56) References Cited

U.S. PATENT DOCUMENTS 9,581,798 B2   2/2017  Loza Alvarez
10,838,192 B2  11/2020 Ozcan
(Continued)

FOREIGN PATENT DOCUMENTS

CA      3102297 A1    12/2019
CN      105379253      3/2016
(Continued)

OTHER PUBLICATIONS

George Barbastathis et al., On the use of deep learning for computational imaging, Optica, vol. 6, No. 8, Aug. 2019, 921-943.
(Continued)

*Primary Examiner* — Xilin Guo
(74) *Attorney, Agent, or Firm* — VISTA IP LAW GROUP LLP

(57) ABSTRACT

A deep learning-based volumetric image inference system and method are disclosed that uses 2D images that are sparsely captured by a standard wide-field fluorescence microscope at arbitrary axial positions within the sample volume. Through a recurrent convolutional neural network (RNN) (referred to herein as Recurrent-MZ), 2D fluorescence information from a few axial planes within the sample is explicitly incorporated to digitally reconstruct the sample volume over an extended depth-of-field. Using experiments on *C. elegans* and nanobead samples, Recurrent-MZ is demonstrated to increase the depth-of-field of a 63x/1.4 NA objective lens by approximately 50-fold, also providing a 30-fold reduction in the number of axial scans required to image the same sample volume. The generalization of this recurrent network for 3D imaging is further demonstrated by showing its resilience to varying imaging conditions, including e.g., different sequences of input images, covering various axial permutations and unknown axial positioning errors.

21 Claims, 26 Drawing Sheets

(58) Field of Classification Search
CPC ........ G06N 3/044; G06N 3/048; G06N 3/084; G06T 17/00; G06T 15/08; G06T 2207/10056; G06T 2207/10064; G06T 7/60; G06T 15/005; G06T 19/003; G02B 21/367; G02B 21/0076; G02B 21/16; G02B 21/0032; G06F 18/214
See application file for complete search history.

(56) References Cited

U.S. PATENT DOCUMENTS

| | | | |
|---|---|---|---|
| 2003/0184730 A1* | 10/2003 | Price | G02B 21/367 702/21 |
| 2005/0125369 A1 | 6/2005 | Buck | |
| 2005/0197977 A1 | 9/2005 | Buck | |
| 2019/0026917 A1 | 1/2019 | Liao | |
| 2019/0294108 A1 | 9/2019 | Ozcan | |
| 2019/0333199 A1 | 10/2019 | Ozcan et al. | |
| 2020/0126234 A1* | 4/2020 | Yokota | G06T 7/174 |
| 2020/0340901 A1 | 10/2020 | Ozcan et al. | |
| 2021/0142170 A1 | 5/2021 | Ozcan et al. | |
| 2021/0149169 A1* | 5/2021 | Leshem | G02B 21/367 |
| 2021/0191094 A1* | 6/2021 | Ye | G02B 21/26 |
| 2021/0264214 A1 | 8/2021 | Ozcan | |
| 2021/0321963 A1* | 10/2021 | Manor | A61B 6/4258 |
| 2022/0028116 A1* | 1/2022 | Sieckmann | H04N 23/67 |
| 2022/0058776 A1 | 2/2022 | Ozcan et al. | |

FOREIGN PATENT DOCUMENTS

| | | |
|---|---|---|
| EP | 3867637 A1 | 8/2021 |
| WO | WO 2014/117079 A1 | 7/2014 |
| WO | WO 2019103909 A1 | 5/2019 |
| WO | WO 2019103909 A1 | 1/2020 |
| WO | WO 2020/082030 A1 | 4/2020 |
| WO | WO 2020082029 A1 | 4/2020 |
| WO | WO 2020102546 A1 | 5/2020 |
| WO | WO 2020139835 A1 | 7/2020 |
| WO | WO 2020219468 A1 | 10/2020 |
| WO | WO 2020242993 A1 | 12/2020 |
| WO | WO 2021003369 A1 | 1/2021 |
| WO | WO 2021133847 A1 | 7/2021 |
| WO | WO 2021154876 A1 | 8/2021 |

OTHER PUBLICATIONS

Neslihan Bayramoglu et al., Towards Virtual H&E Staining of Hyperspectral Lung Histology Images Using Conditional Generative Adversarial Networks, (This ICCV workshop paper is the Open Access version, provided by the Computer Vision Foundation. Except for this watermark, it is identical to the version available on IEEE Xplore), date unknown.
Jianxu Chen et al., Combining Fully Convolutional and Recurrent Neural Networks for 3D Biomedical Image Segmentation, 30th Conference on Neural Information Processing Systems (NIPS 2016), Barcelona, Spain.
Christopher B. Choy et al., 3D-R2N2: A Unified Approach for Single and Multi-view 3D Object Reconstruction, arXiv:1604.00449v1 [cs.CV] Apr. 2, 2016.
Eric M. Christiansen et al., In silico labeling: Predicting fluorescent labels in unlabeled images, Cell. Apr. 19, 2018; 173(3): 792-803. e19. doi:10.1016/j.cell.2018.03.040.
Ozgun Cicek et al., 3D U-Net: Learning Dense Volumetric Segmentation from Sparse Annotation (2016).
Kevin de Haan et al., Deep-Learning-Based Image Reconstruction and Enhancement in Optical Microscopy, Proceedings of the IEEE (2020).
Ian J. Goodfellow et al., Generative Adversarial Nets, (NIPS 2014).
Alex Graves et al., A Novel Connectionist System for Unconstrained Handwriting Recognition, (2009).
Karol Gregor et al., DRAW: A Recurrent Neural Network For Image Generation, arXiv: 502.04623v2 [cs.CV] May 20, 2015.
Diederik P. Kingma et al., Auto-Encoding Variational Bayes, arXiv:1312.6114v10 [stat.ML] May 1, 2014.
Iro Laina et al., Deeper Depth Prediction with Fully Convolutional Residual Networks, arXiv:1606.00373v2 [cs.CV] Sep. 19, 2016.
Manhua Liu et al., Classification of Alzheimer's Disease by Combination of Convolutional and Recurrent Neural Networks Using FDG-PET Images, Frontiers in Neuroinformatics, www.frontiersin.org, Jun. 2018, vol. 12, Article 35.
Pengju Liu et al., MultiLevelWavelet—CNN for Image Restoration, (This ICCV workshop paper is the Open Access version, provided by the Computer Vision Foundation. Except for this watermark, it is identical to the version available on IEEE Xplore), (2018).
Yilin Luo et al., Single-shot autofocusing of microscopy images using deep learning, (2020).
Elias Nehme et al., Deep-STORM: super-resolution single-molecule microscopy by deep learning, Optica, vol. 5, No. 4, Apr. 2018, 458-464.
Thanh Nguyen et al., Deep learning approach to Fourier ptychographic microscopy, Optic Express, vol. 26, No. 20, Oct. 1, 2018, 26470-26484.
Chawin Ounkomol et al., Label-free prediction of three-dimensional fluorescence images from transmitted light microscopy, Nat Methods. Nov. 2018; 15(11): 917-920. doi:10.1038/s41592-018-0111-2.
Henry Pinkard et al., Deep learning for single-shot autofocus microscopy, Optica, vol. 6, No. 6, Jun. 2019, 794-797.
Yair Rivenson et al., Deep Learning Microscopy, (2017).
Yair Rivenson et al., Phase recovery and holographic image reconstruction using deep learning in neural networks, Light: Science & Applications (2018) 7, 17141; doi:10.1038/lsa.2017.141.
Yair Rivenson et al., PhaseStain: the digital staining of label-free quantitative phase microscopy images using deep learning, Light: Science & Applications ( 2019) 8:23.
Yair Rivenson et al., Virtual histological staining of unlabelled tissue-autofluorescence images via deep learning, Nature Biomedical Engineering, vol. 3, Jun. 2019, 466-477, www.nature.com/natbiomedeng.
Abhishek Sharma et al., VConv-DAE: Deep Volumetric Shape Learning Without Object Labels, arXiv:1604.03755v3 [cs.CV] Sep. 9, 2016.
Xingjian Shi et al., Convolutional LSTM Network: A Machine Learning Approach for Precipitation Nowcasting, (NIPS 2015).
Kuan-Lun Tseng et al., Joint Sequence Learning and Cross-Modality Convolution for 3D Biomedical Segmentation, arXiv:1704.07754v1 [cs.CV] Apr. 25, 2017.
Zhou Wang et al., Multi-Scale Structural Similarity for Image Quality Assessment, Published in: Proceedings of the 37th IEEE Asilomar Conference on Signals, Systems and Computers, Pacific Grove, CA, Nov. 9-12, 2003. © IEEE (2003).
Weiyue Wang et al., Shape Inpainting using 3D Generative Adversarial Network and Recurrent Convolutional Networks, arXiv:1711.06375v1 [cs.CV] Nov. 17, 2017.
Hongda Wang et al., Deep learning enables cross-modality super-resolution in fluorescence microscopy, Nat Methods. Jan. 2019 ; 16(1): 103-110. doi:10.1038/s41592-018-0239-0.
Yichen Wu et al., Three-dimensional virtual refocusing of fluorescence microscopy images using deep learning, Nature Methods, (2019), https://doi.org/10.1038/s41592-019-0622-5.
Yichen Wu et al., Extended depth of-field in holographic imaging using deep learning-based autofocusing and phase recovery, Optica, vol. 5, No. 6, Jun. 2018, 704-710.
Yichen Wu et al., Three-dimensional virtual refocusing of fluorescence microscopy images using deep learning, Nature Methods, vol. 16, Dec. 2019, 1323-1331.
Zongwei Zhou et al., UNet++: Redesigning Skip Connections to Exploit Multiscale Features in Image Segmentation, IEEE Trans Med Imaging. Jun. 2020 ; 39(6): 1856-1867. doi: 10.1109/TMI.2019.2959609.
Office Action dated Jul. 18, 2023 for U.S. Appl. No. 17/418,782, filed Jun. 26, 2021, (36 pages).

* cited by examiner

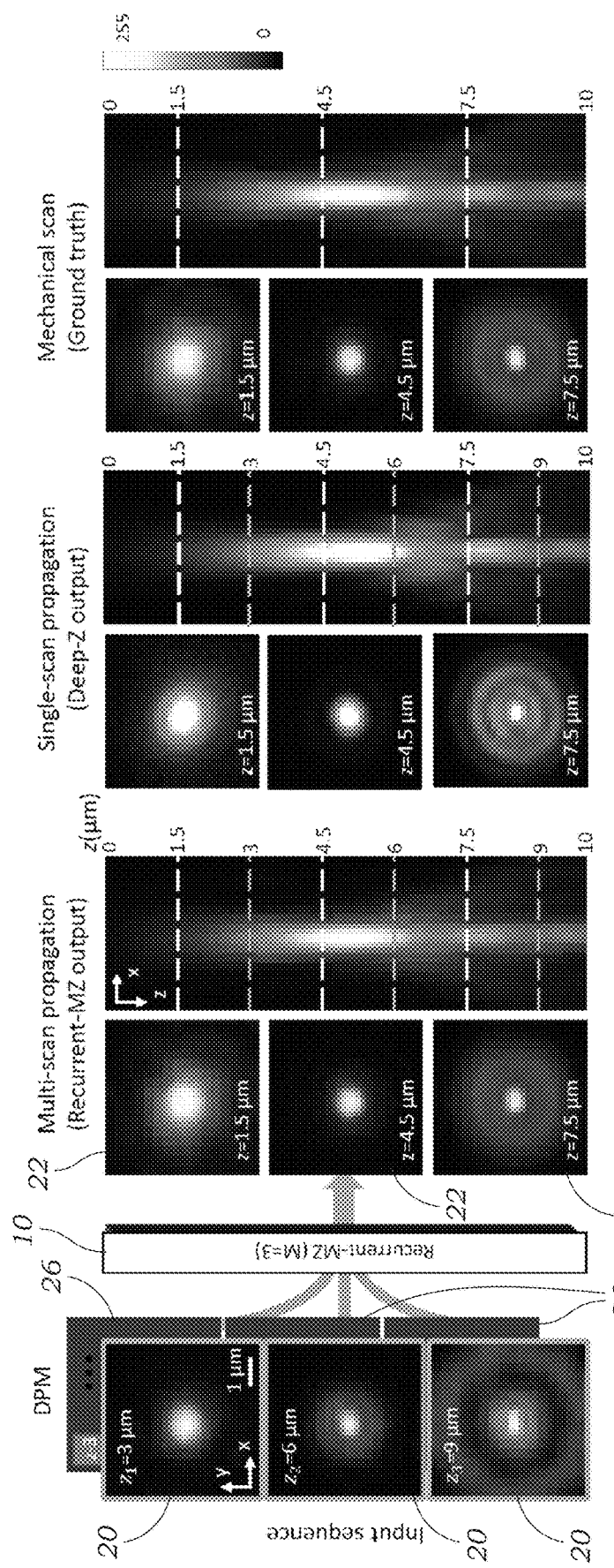
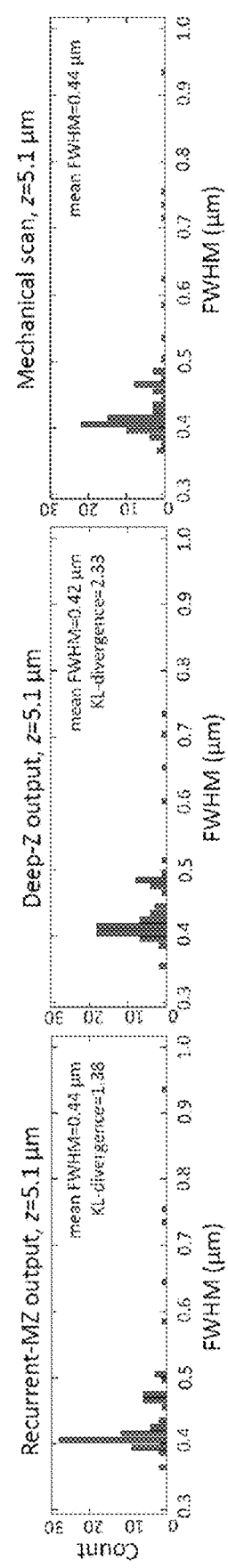
FIG. 4A
FIG. 4B

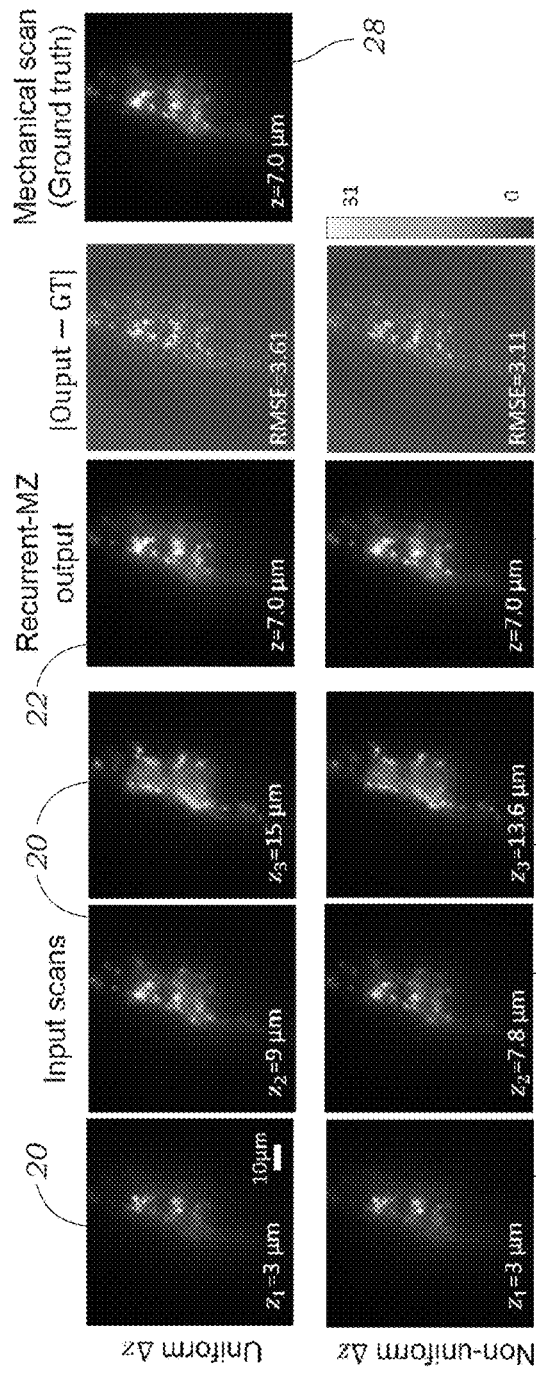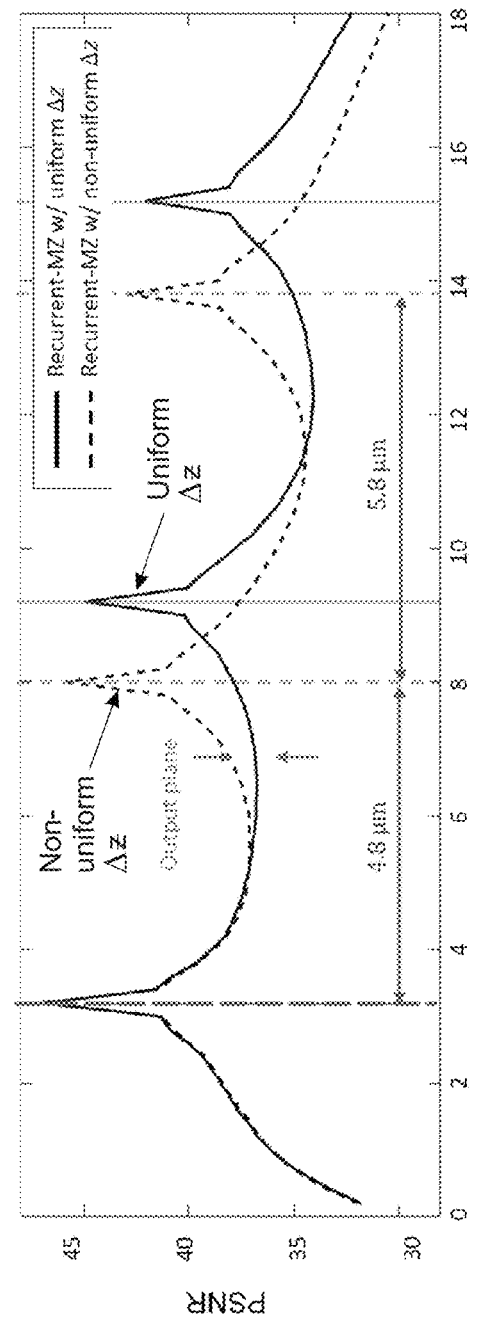
FIG. 5A
FIG. 5B

VOLUMETRIC MICROSCOPY METHODS AND SYSTEMS USING RECURRENT NEURAL NETWORKS

RELATED APPLICATION

This application claims priority to U.S. Provisional Patent Application No. 63/094,264 filed on Oct. 20, 2020, which is hereby incorporated by reference. Priority is claimed pursuant to 35 U.S.C. § 119 and any other applicable statute.

TECHNICAL FIELD

The technical field relates to volumetric or three-dimensional microscopy. More specifically, the technical field relates to systems and methods for volumetric imaging of a sample using a plurality of microscopic images that are input to a trained recurrent convolutional neural network.

BACKGROUND

High-throughput imaging of 3D samples is of significant importance for numerous fields. Volumetric imaging is usually achieved through optical sectioning of samples using various microscopy techniques. Generally, optical sectioning can be categorized based on its dimension of sectioning: (i) 0-dimensional point-wise sectioning, including e.g., confocal, two-photon and three-photon laser scanning microscopy, and time-domain optical coherence tomography (TD-OCT); (ii) 1-dimensional line-wise sectioning, including e.g., spectral domain OCT, (iii) 2-dimensional plane-wise sectioning, including e.g., wide-field and light-sheet fluorescence microscopy. In all of these modalities, serial scanning of the sample volume is required, which limits the imaging speed and throughput, reducing the temporal resolution, also introducing potential photobleaching on the sample. Different imaging methods have been proposed to improve the throughput of scanning-based 3D microscopy techniques, such as multifocal imaging, light-field microscopy, microscopy with engineered point spread functions (PSFs) and compressive sensing. Nevertheless, these solutions introduce trade-offs, either by complicating the microscope system design, compromising the image quality and/or resolution or prolonging the image post-processing time. In addition to these, iterative algorithms that aim to solve the inverse 3D imaging problem from a lower dimensional projection of the volumetric image data, such as the fast iterative shrinkage and thresholding algorithm (FISTA) and alternating direction method of multiplier (ADMM) are relatively time-consuming and unstable, and further require user-defined regularization of the optimization process as well as an accurate forward model of the imaging system. Some of these limitations and performance trade-offs have partially restricted the wide-scale applicability of these computational methods for 3D microscopy.

In recent years, emerging deep learning-based approaches have enabled a new set of powerful tools to solve various inverse problems in microscopy, including e.g., super-resolution imaging, virtual labeling of specimen, holographic imaging, Fourier ptychography microscopy, single-shot autofocusing, three-dimensional image propagation, among many others. Benefiting from the recent advances in deep learning, these methods require minimal modification to the underlying microscopy hardware, and result in enhanced imaging performance in comparison to conventional image reconstruction and post-processing algorithms.

The majority of these neural networks applied in microscopic imaging were designed to perform inference using a single 2D input image. An alternative method to adapt a deep network's inference ability to utilize information that is encoded over volumetric inputs (instead of a single 2D input image) is to utilize 3D convolution kernels. However, this approach requires a significant number of additional trainable parameters and is therefore more susceptible to overfitting. Moreover, simply applying 3D convolution kernels and representing the input data as a sequence of 2D images would constrain the input sampling grid and introduce practical challenges.

SUMMARY

In one embodiment, a trained recurrent neural network (RNN) is used in microscopic image reconstruction. This method or framework is sometimes referred to herein as Recurrent-MZ. Recurrent-MZ permits the digital reconstruction of a sample volume over an extended depth-of-field (DOF) using a few different 2D images of the sample as inputs to a trained RNN (see FIG. 2A). The input 2D images are sparsely sampled at arbitrary axial positions within the sample volume and the convolutional recurrent neural network (Recurrent-MZ) takes these 2D microscopy images as its input, along with a set of digital propagation matrices (DPMs) which indicate the relative distances (dz) to the desired output plane(s). Information from the input images is separately extracted using sequential convolution blocks at different scales, and then the recurrent block aggregates all these features from the previous scans/images, allowing flexibility in terms of the length of the input image sequence as well as the axial positions of these input images, which do not need to be regularly spaced or sampled; in fact, the input 2D images can even be randomly permuted.

The efficacy of the Recurrent-MZ method is demonstrated using multiple fluorescent specimens. First, Recurrent-MZ inference was demonstrated for 3D imaging of *C. elegans* samples, and then quantify its performance using fluorescence nanobeads. The results demonstrate that Recurrent-MZ increases the depth-of-field of a 63×/1.4 NA objective lens by approximately 50-fold, also providing a 30-fold reduction in the number of axial scans required to image a sample volume. Furthermore, the robustness of this framework has been demonstrated including the inference to axial permutations of the input images as well to uncontrolled errors and noise terms in the axial positioning of different input image scans.

In one embodiment, a microscopy method includes: providing a trained recurrent neural network that is executed by software using one or more processors. A plurality of microscopy input images of a sample volume obtained at different axial distances are input to the trained recurrent neural network, wherein the plurality of input images are each appended with a digital propagation matrix (DPM) that represents, pixel-by-pixel, an axial distance of a user-defined or automatically generated surface within the sample volume from a plane of the corresponding input image. The trained recurrent neural network outputs one or more output images of the sample from the trained recurrent neural network that is/are digitally propagated or refocused to the user-defined or automatically generated surface(s) defined by the DPMs.

In another embodiment, a system for outputting microscopy images of a sample volume includes a computing device having image processing software executed thereon, the image processing software including a trained recurrent neural network that is executed using one or more processors of the computing device, wherein the trained recurrent neural network is trained using matched pairs of (1) a plurality of images obtained at different axial depths within the sample volume and appended with different digital propagation matrices (DPMs) each of which represents, pixel-by-pixel, an axial distance of a user-defined or automatically generated surface within the sample volume from a plane of the input image, and (2) corresponding ground truth images captured at a correct/target focus depth defined by the corresponding DPM, the image processing software configured to receive microscopy input images of a sample appended with a corresponding DPM and outputting one or more output image(s) of the sample from the trained recurrent neural network that are digitally propagated to one or more user-defined or automatically generated surface(s) defined by the appended DPM(s) to the microscopy input images.

BRIEF DESCRIPTION OF THE DRAWINGS

FIGS. 4A and 4B illustrate the performance of Recurrent-MZ using fluorescence nanobeads. FIG. 4A illustrates volumetric imaging using Recurrent-MZ (M=3) and Deep-Z on 50 nm fluorescence nanobeads. There are three (3) input images for Recurrent-MZ (M=3) and to provide a fair comparison, Deep-Z always takes in the nearest input image among these three (3) inputs to infer another axial plane. The PSFs generated by Recurrent-MZ, Deep-Z and mechanical scanning ($\Delta z=0.1$ μm) are shown for comparison. FIG. 4B shows the lateral FWHM histograms for 88 individual isolated fluorescence nanobeads, measured from mechanical scanning (101 axial images; right), Deep-Z reconstruction (middle) and Recurrent-MZ reconstruction (M=3) (left).

FIG. 5A illustrates the generalization of Recurrent-MZ to non-uniformly spaced input images. The Recurrent-MZ network was trained on C. elegans samples with equidistant inputs (M=3, $\Delta z=6$ μm), and blindly tested on both uniformly sampled and non-uniformly sampled input images of new samples.

FIG. 5B shows the PSNR values of the output images from the network of FIG. 5A (with uniformly spaced and non-uniformly spaced input images) are calculated with respect to the ground truth, corresponding image. Uniform $\Delta z$: outputs of Recurrent-MZ (M=3) for uniformly spaced inputs, Non-uniform $\Delta z$: outputs of Recurrent-MZ (M=3) for non-uniformly spaced inputs. Dashed vertical lines indicate the axial positions of the input 2D images.

FIG. 6A shows an additive Gaussian noise with zero mean and a standard variance of $\sigma$ was injected into each DPM to test the stability of Recurrent-MZ inference. The output images and difference maps (with respect to ground truth) with no injected noise ($\sigma=0$) and $\sigma=1$ μm and $\sigma=0.5$ μm are shown. FIG. 6B shows plots of the NRMSE-$\sigma$ boxplot (z=4.6 μm—left; z=6.8 μm—right). NRMSE values were calculated over 50 random tests. The difference maps were normalized by the maximum difference between the input images and the ground truth.

FIG. 7A: The input scans sorted by z, and the RMSE values between the ground truth image and the corresponding nearest input image are shown. FIG. 7B shows the Recurrent-MZ outputs and the corresponding difference maps of the input sequence ($I_1$, $I_2$, $I_3$) (FIG. 7C) the test output with input sequence ($I_2$, $I_1$, $I_3$), and the pixel-wise standard variance over all the 6 random permutations. The ground truth images were obtained by mechanical scanning through the same sample, acquired with an axial spacing of 0.2 μm (FIG. 7D). FIG. 7E illustrates the RMSE as function of z. Illustrated are: the average RMSE of the outputs of randomly permuted input images (random line); the standard deviation RMSE of the outputs of randomly permuted input images (shadowed region); the RMSE of the output of input images sorted by z (sorted by z line). The range of grayscale images is 255 while that of the standard variance images is 31.

FIG. 8A illustrates the input images and the ground truth image obtained by mechanical scanning (with an axial spacing of 0.2 μm). FIG. 8B shows the Recurrent-MZ outputs and the corresponding difference maps of repeated $I_1$, i.e., $V_{ii}(I_1, I_1)$, $V_{ii}(I_1, I_1, I_1, I_1)$ and $V_{ii}(I_1, I_1, I_1, I_1, I_1, I_1)$ as well as $V_{ii}(I_1, I_2)$ and $V_{ii}(I_2, I_1)$. FIG. 8C shows the outputs and corresponding difference maps of Deep-Z with a single input image ($I_1$ or $I_2$), and the pixel-wise average of Deep-Z($I_1$) and Deep-Z($I_2$). All RMSE values are calculated based on the region of interest (ROI) marked by the box region of FIG. 8A. The range of grayscale images is 255 while that of the standard variance images is 31.

FIG. 9A schematically illustrates the two networks were trained on the same dataset. The network with M=2 takes in the two (2) nearest input images to the output plane, while the network with M=3 takes in all three (3) input images. FIG. 9B shows a plot of the PSNR values of the output images are calculated with respect to the corresponding ground truth image. Shown are outputs of the Recurrent-MZ (M=2) and outputs of the Recurrent-MZ (M=3).

FIG. 11A shows the PSNR of the outputs of Recurrent-MZ (M=3) that were trained using different Δz=4, 6, 8 μm settings but blindly tested on new samples imaged with Δz=6 μm. The input images are captured at z=3, 6, 9 μm. FIG. 11B shows the boxplot of the PSNR of aforementioned three (3) networks, showing the trade-off between the peak performance and performance consistency over the sample axial range.

(FIG. 12A) The input scans sorted by z, (FIG. 12B) the mean output and standard variance generated by Recurrent-MZ over 6 input image permutations, (FIG. 12C) the mean output and pixel-wise standard variance generated by 3D U-Net over 6 input image permutations, (FIG. 12D) the ground truth images obtained by mechanical scanning. FIG. 12E illustrates the RMSE vs. z plot. Illustrated include: average RMSE of the output images generated by Recurrent-MZ over 6 random permutation of the inputs; shadow: standard variance of the RMSE of the output images generated by Recurrent-MZ over 6 random permutation of the inputs. Also illustrated is the RMSE of the output images generated by Recurrent-MZ with inputs sorted by z. The average RMSE of the output images generated by 3D U-Net over 6 random permutation of the inputs is also shown.

(FIG. 13A) The input sequence and ground truth image of the test FOV. Recurrent-MZ (M=3) was trained, separately, with input sequences sorted by z, sorted by dz, as well as randomly sorted images. The corresponding Recurrent-MZ networks were then tested with (FIG. 13B) the same image sorting used in training, and (FIG. 13C) 6 random permutations of the original input sequence. FIG. 13D is a plot of the RMSE values of the output images of Recurrent-MZ trained using these three different schemes.

FIG. 14A shows the input images/scans and the corresponding mechanical scan (ground truth) image. FIG. 14B shows the output images of Recurrent-MZ (M=3) with the repetition of the nearest input ($I_3$), 2 nearest inputs ($I_2$, $I_3$) and all three input images. FIG. 14C shows the outputs of Deep-Z with single input (h, $I_2$ or $I_3$), and the pixel-wise average of three Deep-Z outputs, i.e., Deep-Z($I_1$), Deep-Z($I_2$) and Deep-Z($I_3$). The range of grayscale images is 255 while that of standard variance images is 31.

FIG. 15A illustrates how the Recurrent-MZ+ network takes in M=3 wide-field input images along with the corresponding DPMs, and rapidly outputs an image at the designated/desired axial plane, matching the corresponding confocal scan of the same sample plane. FIG. 15B shows maximum intensity projection (MIP) side views (x-z and y-z) of the wide-field (46 image scans), Recurrent-MZ+ (M=3) and the confocal ground truth image stack. Each scale bar is 2 μm. Horizontal arrows in FIG. 15B mark the axial planes of $I_1$, $I_2$ and $I_3$.

DETAILED DESCRIPTION OF ILLUSTRATED EMBODIMENTS

Figure 1A:
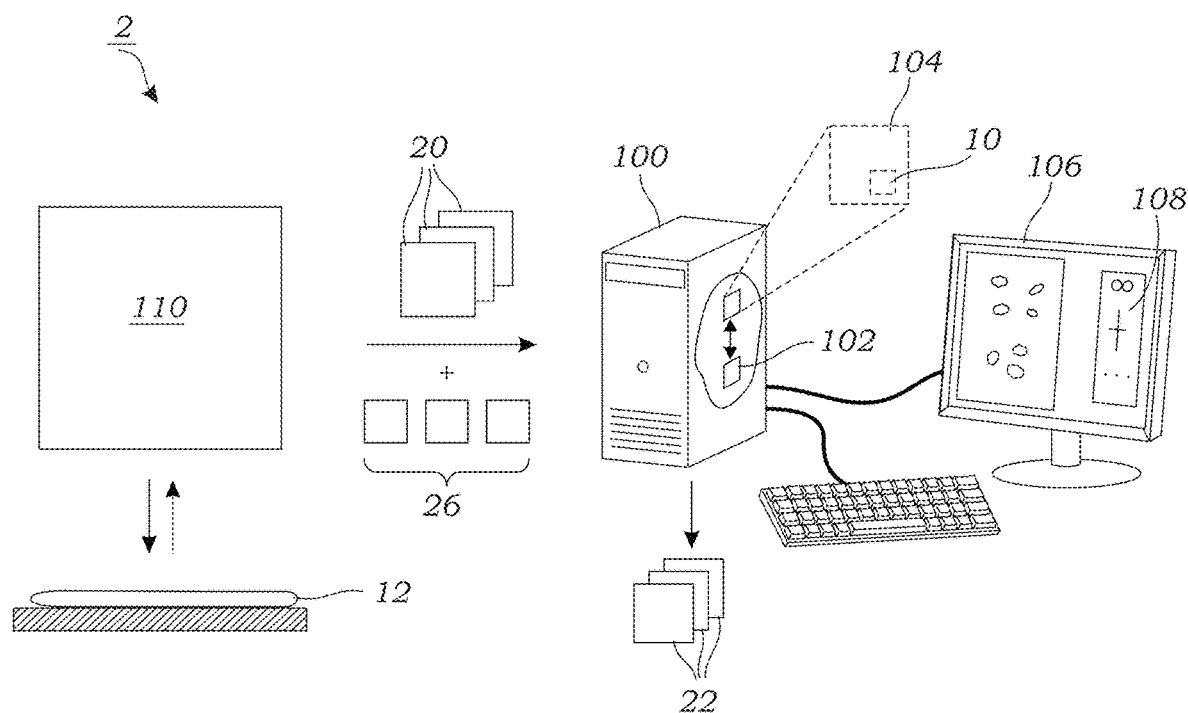
FIG. 1A illustrates one embodiment of a system that uses a trained recurrent neural network to generate one or more output image(s) of the sample that is digitally propagated (refocused) to the user-defined or automatically generated surface. The system obtains a plurality of images which are input to the trained recurrent neural network. The trained recurrent neural network then outputs digitally propagated (refocused) image(s) to user-defined or automatically generated surface(s) including three-dimensional surfaces. Multiple such images may be used to create a volumetric image of all or a portion of the sample.

FIG. 1A illustrates one embodiment of a system 2 that uses a trained recurrent neural network 10 that receives or uses a plurality of input images 20 obtained at different depths (e.g., z distances) within a sample 12 to generate one or more output image(s) 22 of a sample 12 (or one or more object(s) in the sample 12). The one or more output image(s) 22 is/are digitally propagated to one or more user-defined or automatically generated surface(s) 30 (seen in FIG. 1B). The system 2 includes a computing device 100 that contains one or more processors 102 therein and image processing software 104 that incorporates the trained recurrent neural network 10. The computing device 100 may include, as explained herein, a personal computer, laptop, tablet PC, remote server, application-specific integrated circuit (ASIC), or the like, although other computing devices 100 may be used (e.g., devices that incorporate one or more graphic processing units (GPUs)). As explained herein, in one particular embodiment, a plurality of two-dimensional (2D) input images 20 are input to the trained recurrent neural network 10, to generate output images 22 that are used to define a three-dimensional (3D) volumetric image of all or a portion of the sample 12.

Figure 1B:
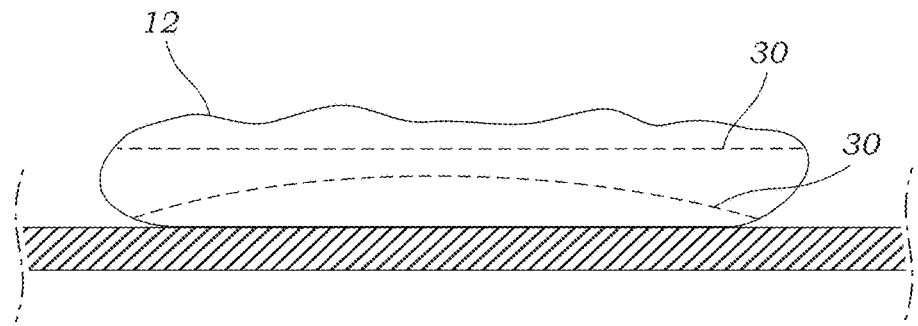
FIG. 1B illustrates a cross-sectional view of a sample showing examples of user-defined or automatically generated surfaces.
Figure 1C:
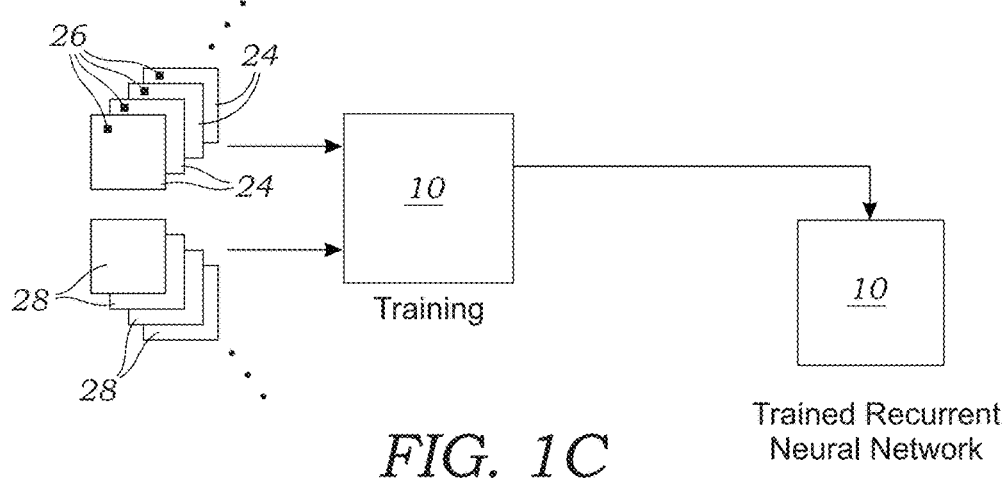
FIG. 1C schematically illustrates the process used to train the recurrent neural network.

With reference to FIG. 1C, the trained recurrent neural network 10 is trained using matched pairs of: (1) a plurality of microscopy training images 24 obtained at different axial depths within a sample, each appended with different digital propagation matrices (DPMs) 26 or other appended data structure which represent, pixel-by-pixel, an axial distance(s) of a user-defined or automatically generated surface 30 within the sample 12 from a plane of the input image 24, and (2) corresponding ground truth microscopy images 28 captured at a correct/target focus depth defined by the corresponding DPM 26. The training microscopy images 24 and corresponding ground truth microscopy images 28 are, in one embodiment, obtained using fluorescence microscopy (e.g., a fluorescent microscope 110). However, the methods and systems are applicable to other microscopy modalities or microscopes 110 as explained herein. These include, for example, microscopy images obtained with a super-resolution microscope, a STED microscope, a PALM/STORM-based microscope, a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope.

In some embodiments, the ground truth images 28 used in training of the recurrent neural network 10 (e.g., FIG. 2C) are obtained by using one or more of the following types of microscopes 110: a super-resolution microscope, a STED microscope, a PALM/STORM-based microscope a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope. In some embodiments, the plurality of the ground truth images 28 used in the training of the recurrent neural network 10 and the corresponding input training images 24 are acquired using different types of microscopes 110 and/or different microscopic imaging modalities. In other embodiments, the plurality of the ground truth images 28 used in the training of the recurrent neural network 10 and the corresponding input training images 24 are acquired using the same types of microscopes 110 and/or same microscopic imaging modalities.

In some embodiments, a series or time sequence of output images 22 are generated by the trained recurrent neural network 10, e.g., a time-lapse video clip or movie of the sample 12 or objects therein. The trained recurrent neural network 10 receives one or more microscopy input image(s) 20 (e.g., multiple images taken at different times) of the sample 12 (e.g., fluorescence microscopy images) obtained by the microscope device 110. The input images 20 are obtained at different depths or heights within the sample 12. This may be accomplished by a moveable stage that adjusts the optics of the microscope device 110 and/or a sample holder holding the sample 12. Of course, other ways of obtaining different images 20 at different depths or heights may be employed even without mechanical movement of the sample 12 and/or optical components of the microscope device 110.

The sample 12 may include, by way of illustration and not limitation, a pathological slide, biopsy, bodily fluid, organism (living or fixed), cell(s) (living or fixed), tissue (living or fixed), cellular or sub-cellular feature(s), fluid or liquid sample containing organisms or other microscopic objects. In one embodiment, the sample 12 may be label-free and the fluorescent light that is emitted from the sample 12 is emitted from an endogenous fluorophore or other endogenous emitters of frequency-shifted light within the sample 12 (e.g., autofluorescence). In another embodiment, the sample 12 is labeled with one or more exogenous fluorescent labels or other exogenous emitters of light. Combinations of the two are also contemplated.

The one or more input image(s) 20 is/are obtained using a microscope device 110, for example, a fluorescence microscope device 110. Other types of microscope devices 110 may also be used to image the sample 12. Other types of microscope devices 110 include by way of example: a super-resolution microscope, a STED microscope, a PALM/STORM-based microscope a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope.

The trained recurrent neural network 10 outputs or generates (when trained with fluorescence microscope images 24) one or more fluorescence output image(s) 22 that is/are digitally propagated to a user-defined or automatically generated surface 30 such as the two examples shown in FIG. 1B. The user-defined or automatically generated surface 30 may be established by a digital propagation matrix (DPM) 26 or other appended data structure much like the DPMs 26 used in the training of the recurrent neural network 10. The user-defined or automatically generated surface 30 may include a two-dimensional (2D) surface or a three-dimensional (3D) surface. For example, this may include, a plane at different axial depths within the sample 12. The plane may also, in some embodiments, be tilted which may correct for slight tilts in the sample 12. The user-defined or automatically generated surface 30 may also include a curved or other 3D surface. In some embodiments, the user-defined or automatically generated surface 30 may be a surface that corrects for sample tilt (e.g., tilted plane), curvature, or other optical aberrations. The user-defined or automatically generated surface 30, which as explained herein may include a DPM 26, is in some embodiments, appended to (e.g., through a concatenation operation) or otherwise associated with the input image(s) 20 that is/are input to the trained recurrent neural network 10. The DPM 26 or other data structure that defines the user-defined or automatically generated surface 30 may also be stored, for example, in the image processing software 104 and selected by the user. For example, various DPMs 26 may be stored which can be selected by the user. The trained recurrent neural network 10 then outputs the output image(s) 22 at the user-defined or automatically generated surface 30.

The input image(s) 20 to the trained recurrent neural network 10 in some embodiments, may have the same or substantially similar numerical aperture and resolution as the ground truth images 28 used to train the recurrent neural network 10. In other embodiments, the input image(s) 20 may have a lower numerical aperture and poorer resolution compared to the ground truth images 28. In this later embodiment, the trained recurrent neural network 10 performs both virtual refocusing and improving the resolution (e.g., super-resolutions) of the input image(s) 20. This additional functionality is imparted to the recurrent neural network 10 by training the same to increase or improve the resolution of the input image(s) 20.

Figure 2A:
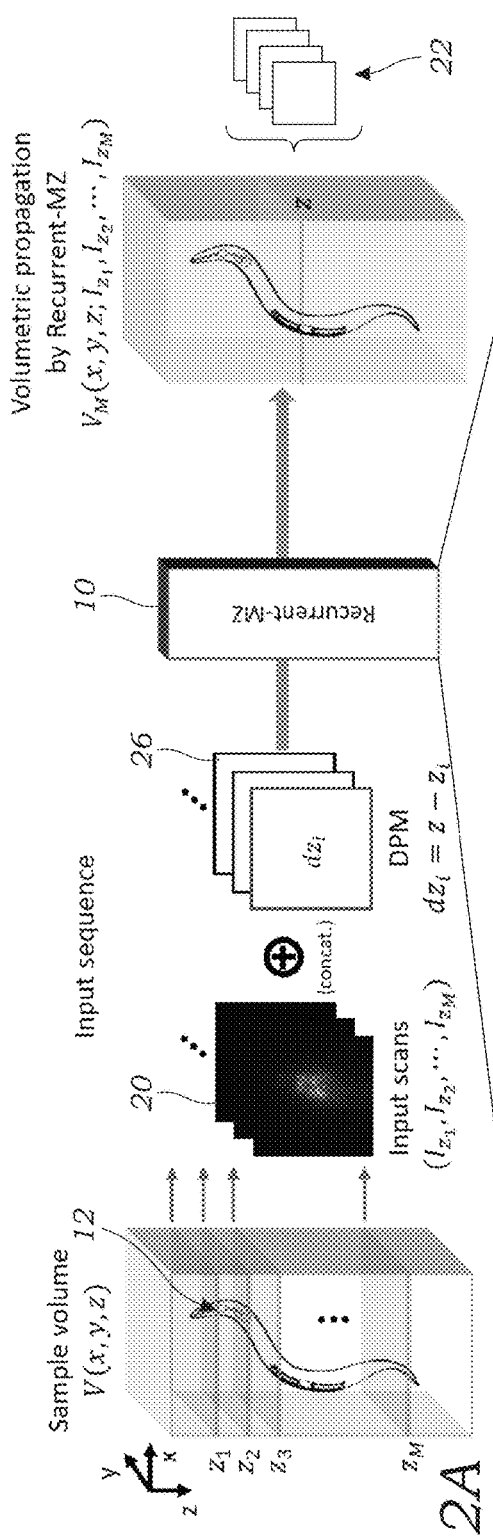
FIG. 2A schematically illustrates volumetric imaging through the Recurrent-MZ. volumetric imaging framework. M is the number of input scans (2D images), and each input scan is paired with its corresponding DPM (Digital Propagation Matrix).

In other embodiments, multiple user-defined or automatically generated surfaces 30 may be combined to create a volumetric (3D) image of the sample 12 using a plurality of output images 22 (FIG. 2A). Thus, a stack of output images 22 generated using the trained recurrent neural network 10 may be merged or combined to create a volumetric image of the sample 12. The volumetric image may also be generated as a function of time, e.g., a volumetric movie or time-lapse video clip that shows movement within the volume over time. In a similar fashion, multiple user-defined or automatically generated surfaces 30 may be used to create an output image 22 with an extended depth of field (EDOF) that extends the depth of field of the microscope 110 used to generate the input image 20. In this option, a plurality of output images 22 using a plurality of DPMs 26 are digitally combined to create an EDOF image of the sample 12. In a related embodiment, the output image(s) 22 using one or more DPMs 26 are used to create an improved-focus image of the sample 12.

The output image(s) 22 (including super-resolved images or EDOF images), time-lapse video clip(s), movie(s) may be displayed on a display 106 associated with the computing device 100, but it should be appreciated the image(s) 22 may be displayed on any suitable display (e.g., computer monitor, tablet computer, mobile computing device, etc.). Input images 20 may also optionally be displayed with the one or more output image(s) 22. The display 106 may include a graphical user interface (GUI) 108 or the like that enables the user to interact with various parameters of the system 2. For example, the GUI 108 may enable to the user to define or select certain time sequences of images 22 to present on the display 106. The GUI 108 may thus include common movie-maker tools that allow the user to clip or edit a sequence of images 22 to create a movie or time-lapse video clip. The GUI 108 may also allow the user to easily define the particular user-defined surface(s) 30. For example, the GUI 108 may include a knob, slide bar, or the like that allows the user to define the depth of a particular plane or other surface within the sample 12. The GUI 108 may also have a number of pre-defined or arbitrary user-defined or automatically generated surfaces 30 that the user may choose from. These may include planes at different depths, planes at different cross-sections, planes at different tilts, curved or other 3D surfaces that are selected using the GUI 108. This may also include a depth range within the sample 12 (e.g., a volumetric region in the sample 12). The GUI 108 tools may permit the user to easily scan along the depth of the sample 12. The GUI 108 may also provide various options to augment or adjust the output image(s) 22 including rotation, tilt-correction, and the like. In one preferred embodiment, the user-defined or automatically generated surfaces 30 are formed as a digital propagation matrix (DPM) 26 that represents, pixel-by-pixel, the axial distance of the desired or target surface from the plane of the input image 20. In other embodiments, the image processing software 104 may suggest or provide one or more user-defined or automatically generated surfaces 30 (e.g., DPMs 26). For example, the image processing software 104 may automatically generate one or more DPMs 26 that correct for one or more optical aberrations. This may include aberrations such as sample drift, tilt and spherical aberrations. Thus, the DPM(s) 26 may be automatically generated by an algorithm implemented in the image processing software 104. Such an algorithm, which may be implemented using a separate trained neural network or software, may operate by having an initial guess with a surface or DPM 26 that is input with an input image 20. The result of the network or software output is analyzed according to a metric (e.g., sharpness or contrast). The result is then used to generate a new surface represented by a different DPM 26 that is input with an input image 20 and analyzed as noted above until the result has converged on a satisfactory result (e.g., sufficient sharpness or contrast has been achieved or a maximum result obtained). The image processing software 104 may use a greedy algorithm to identify these DPMs 26 based, for example, on a surface that maximizes sharpness/contrast in the image. An important point is that these corrections may take place offline and not while the sample 12 is being imaged.

The GUI 108 may provide the user the ability to watch selected movie clips or time-lapse videos of one or more moving or motile objects in the sample 12. In one particular embodiment, simultaneous movie clips or time-lapse videos may be shown on the display 106 with each at different focal depths. As explained herein, this capability of the system 2 eliminates the need for mechanical axial scanning and related optical hardware but also significantly reduces phototoxicity or photobleaching within the sample to enable longitudinal experiments (e.g., enables a reduction of photon dose or light exposure to the sample 12). In addition, the virtually created time-lapse videos/movie clips are temporally synchronized to each other (i.e., the image frames 20 at different depths have identical time stamps) something that is not possible with scanning-based 3D imaging systems due to the unavoidable time delay between successive measurements of different parts of the sample volume (i.e., movement of the optical components required for scanning).

In one embodiment, the system 2 may output image(s) 22 in substantially real-time with the input image(s) 20. That is to say, the acquired input image(s) 20 are input to the trained recurrent neural network 10 along with the user-defined or automatically generated surface(s) 30 and the output image(s) 22 are generated or output in substantially real-time. In another embodiment, the input image(s) 20 may be obtained with the microscope device 110 and then stored in a memory or local storage device (e.g., hard drive or solid-state drive) which can then be run through the trained recurrent neural network 10 at the convenience of the operator.

EXPERIMENTAL

The target sample volume V(x, y, z) is formulated as a random field on the set of all axial positions Z, i.e., $I_z \in \mathbb{R}^{m \times n}$, $z \in Z$, where x, y are pixel indices on the lateral plane, m, n are the lateral dimensions of the image, and z is a certain axial position in Z. The distribution of such random fields is defined by the 3D distribution of the sample 12 of interest, the PSF of the microscope 110 device/system, the aberrations and random noise terms present in the image acquisition system. Recurrent-MZ takes in a set of M 2D axial images, i.e., $\{I_{z_1}, I_{z_2}, \ldots, I_{z_M}\}$, $1 < M << |Z|$, where $|Z|$ is the cardinality of Z, defining the number of unique axial planes in the target sample 12. The output inference of Recurrent-MZ estimates (i.e., reconstructs) the volume of the sample 12 and is be denoted as $V_M(x, y, z; I_{z_1}, I_{z_2}, \ldots, I_{z_M})$. Recurrent-MZ inference results are summarized below using different fluorescent samples.

Recurrent-MZ Based Volumetric Imaging of C. elegans Samples

Figure 3:
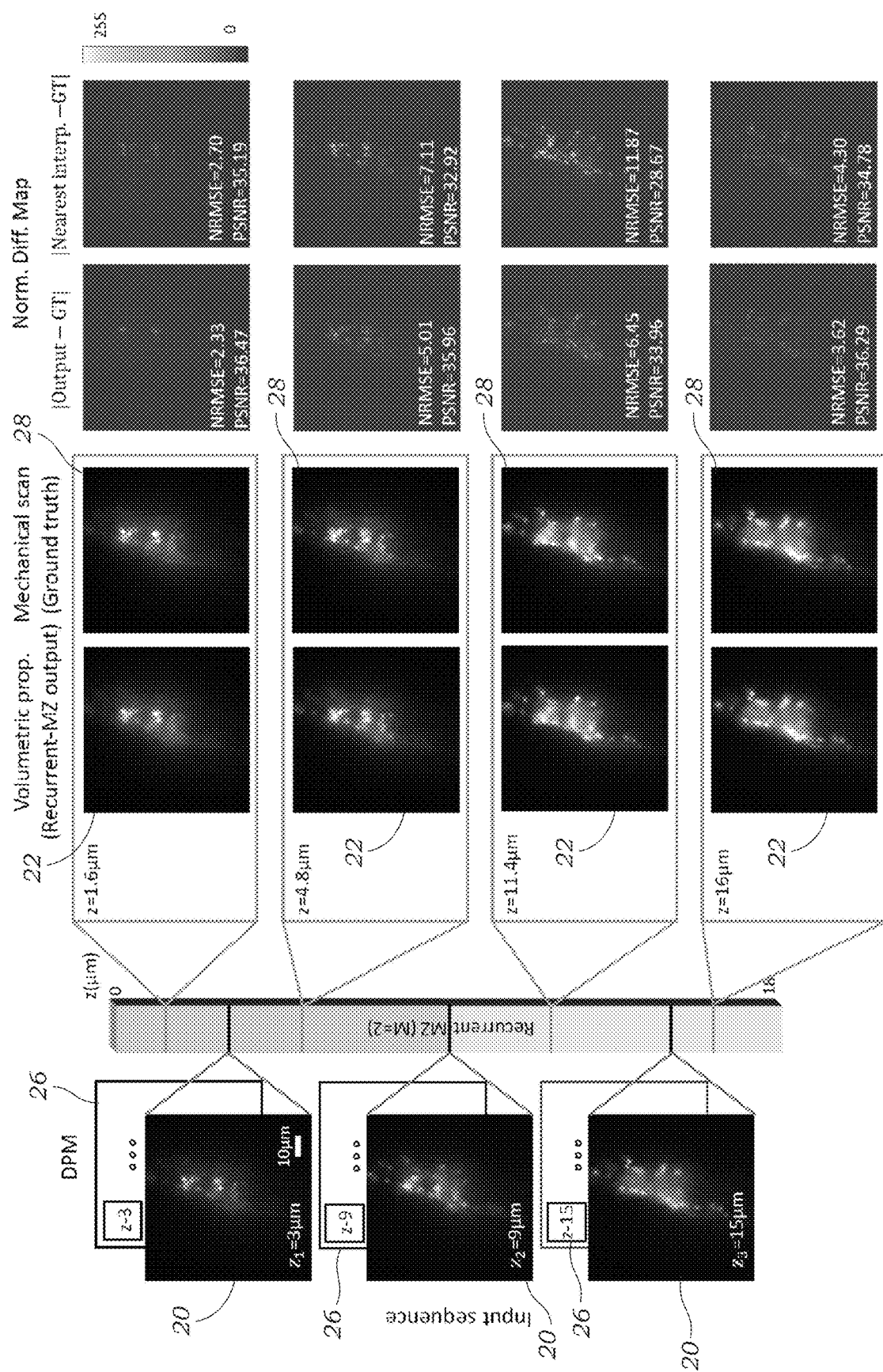
FIG. 3 illustrates volumetric imaging of C. elegans from sparse wide-field scans using Recurrent-MZ. The DPMs in the input sequence are used to define an arbitrary axial position (z) within the sample volume. In this implementation, Recurrent-MZ takes in 2 input scans (M=2) to infer the image of an output plane.

A Recurrent-MZ network 10 was trained and validated using C. elegans samples 12, and then blindly tested on new specimens 12 that were not part of the training/validation dataset. This trained Recurrent-MZ 10 was used to reconstruct C. elegans samples 12 with high fidelity over an extended axial range of 18 μm based on three 2D input images 20 that were captured with an axial spacing of Δz=6 μm; these three 2D images 20 were fed into Recurrent-MZ network 10 in groups of two, i.e., M=2 (FIG. 3). The comparison images of the same sample volume were obtained by scanning a wide-field fluorescence microscope with a 63×/1.4 NA objective lens and capturing |Z|=91 images with an axial spacing of Δz=0.2 μm (see the Methods herein). The inference performance of Recurrent-MZ is both qualitatively and quantitatively demonstrated in FIG. 3. Even in the middle of two adjacent input images 20 (see the z=11.4 μm row of FIG. 3), the Recurrent-MZ network 10 is able to output images 22 with a very good match to the ground truth image 28, achieving a normalized root mean square error (NRMSE) of 6.45 and a peak signal-to-noise ratio (PSNR) of 33.96. Moreover, when the output axial position is selected to be adjacent to one of the input images 20 (see the z=1.6 μm row of FIG. 3), the Recurrent-MZ network 10 even outperforms the nearest neighbor interpolation, achieving NRMSE=2.33 and PNSR=36.47. The Recurrent-MZ network 10 is able to significantly extend the axial range of the reconstructed images 22 using only three 2D input images 20, each captured with a 1.4 NA objective lens that has a depth-of-field of 0.4 µm.

Figure 9A:
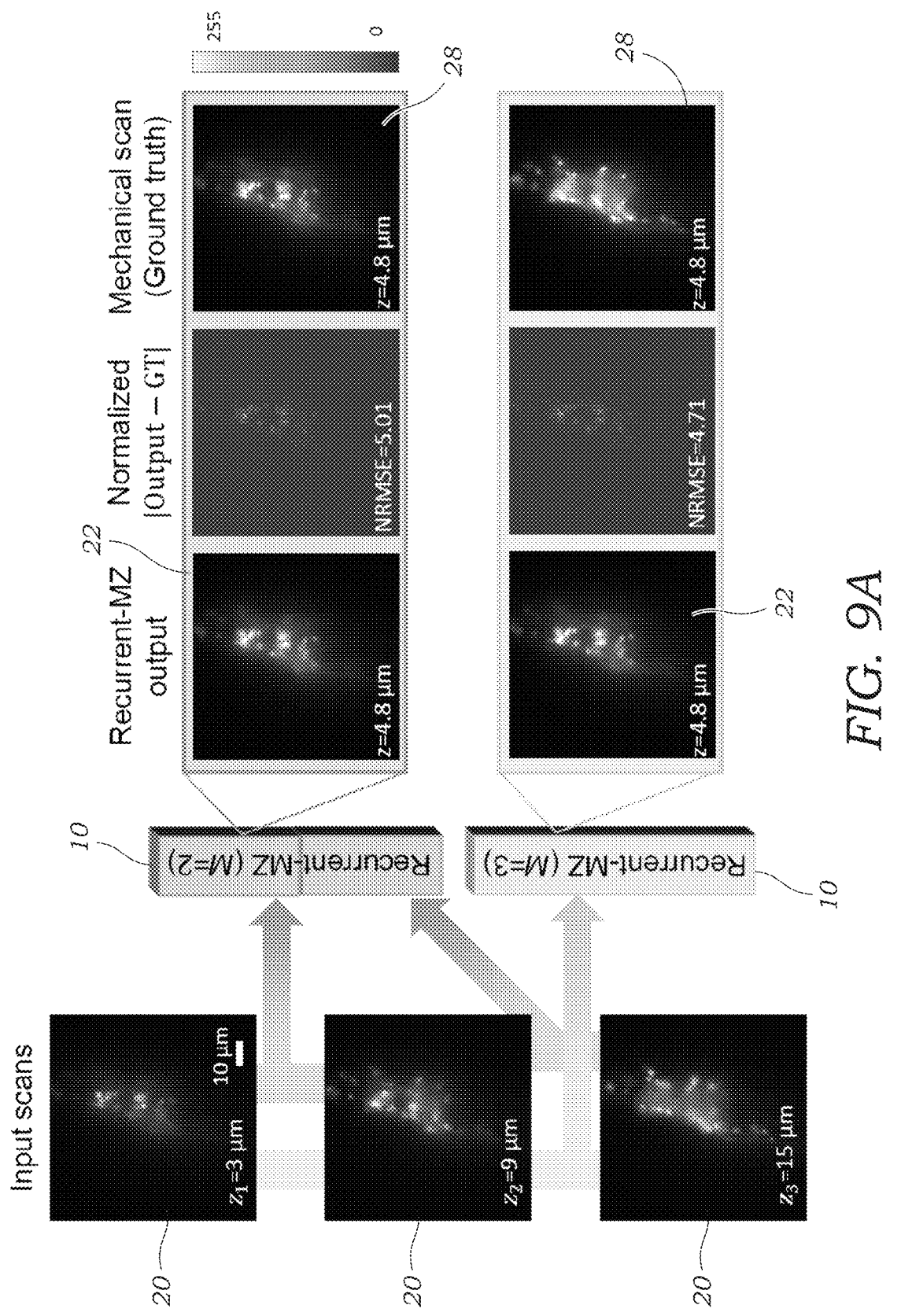
FIGS. 9A-9B illustrate a comparison of the use of different M in Recurrent-MZ.
Figure 9B:
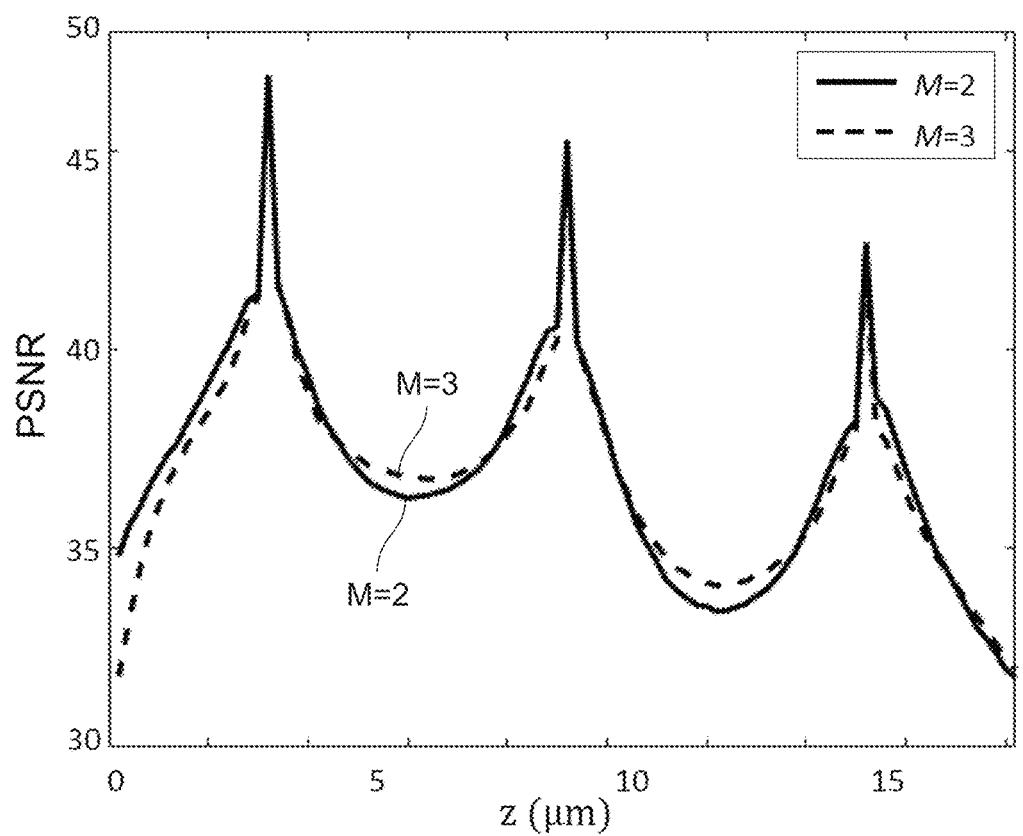

It is worth noting that although the Recurrent-MZ network 10 used for the results presented in FIG. 3 was trained with two (2) input images 20 (i.e., M=2), it still can be fed with M≥3 input images 20 thanks to its recurrent scheme. Regardless of the choice of M, all Recurrent-MZ networks 10 have the same number of parameters, where the only difference is the additional time that is required during the training and inference phases. For example, the inference time of Recurrent-MZ network 10 with M=2 and M=3 for a single output plane (1024×1024 pixels) is 0.18 s and 0.28 s, respectively. In practice, using a larger M yields a better performance in terms of the reconstruction fidelity (see e.g., FIGS. 9A and 9B), at the cost of a trade-off of imaging throughput and computation time.

Recurrent-MZ Based Volumetric Imaging of Fluorescence Nanobeads

Next, the performance of the Recurrent-MZ network 10 was demonstrated using 50 nm fluorescence nanobeads. These nanobead samples 12 were imaged through the TxRed channel using a 63×/1.4 NA objective lens (see the Methods section). The Recurrent-MZ network 10 was trained on a dataset with M=3 input images 24, where the axial spacing between the adjacent planes was $\Delta z=3$ µm. The ground truth images 28 of the sample volume were captured by mechanical scanning over an axial range of 10 µm, i.e., |Z|=101 images with $\Delta z=0.1$ µm were obtained. FIG. 4A shows both the side views and the cross-sections of the sample volume reconstructed by Recurrent-MZ network 10 (M=3), compared against the |Z|=101 images captured through the mechanical scanning of the same sample. The first column of FIG. 4A presents the M=3 input images 20 and their corresponding axial positions, which are also indicated by the horizontal dashed lines (at 3, 6, 9 µm). Through the quantitative histogram comparison shown in FIG. 4B, one can see that the reconstructed volume by the Recurrent-MZ network 10 matches the ground truth volume with high fidelity. For example, the full width at half maximum (FWHM) distribution of individual nanobeads 12 inferred by Recurrent-MZ network 10 (mean FWHM=0.4401 µm) matches the results of the ground truth (mean FWHM=0.4428 µm) very well. The similarity of the ground truth histogram with that of the Recurrent-MZ network 10 output is shown by calculating the Kullback-Leibler (KL) divergence, which is a distance measure between two distributions; the resulting KL divergence of 1.3373 further validates the high fidelity of Recurrent-MZ network 10 reconstruction when compared to the ground truth, acquired through |Z|=101 images captured via mechanical scanning of the sample with $\Delta z=0.1$ µm.

Figure 10:
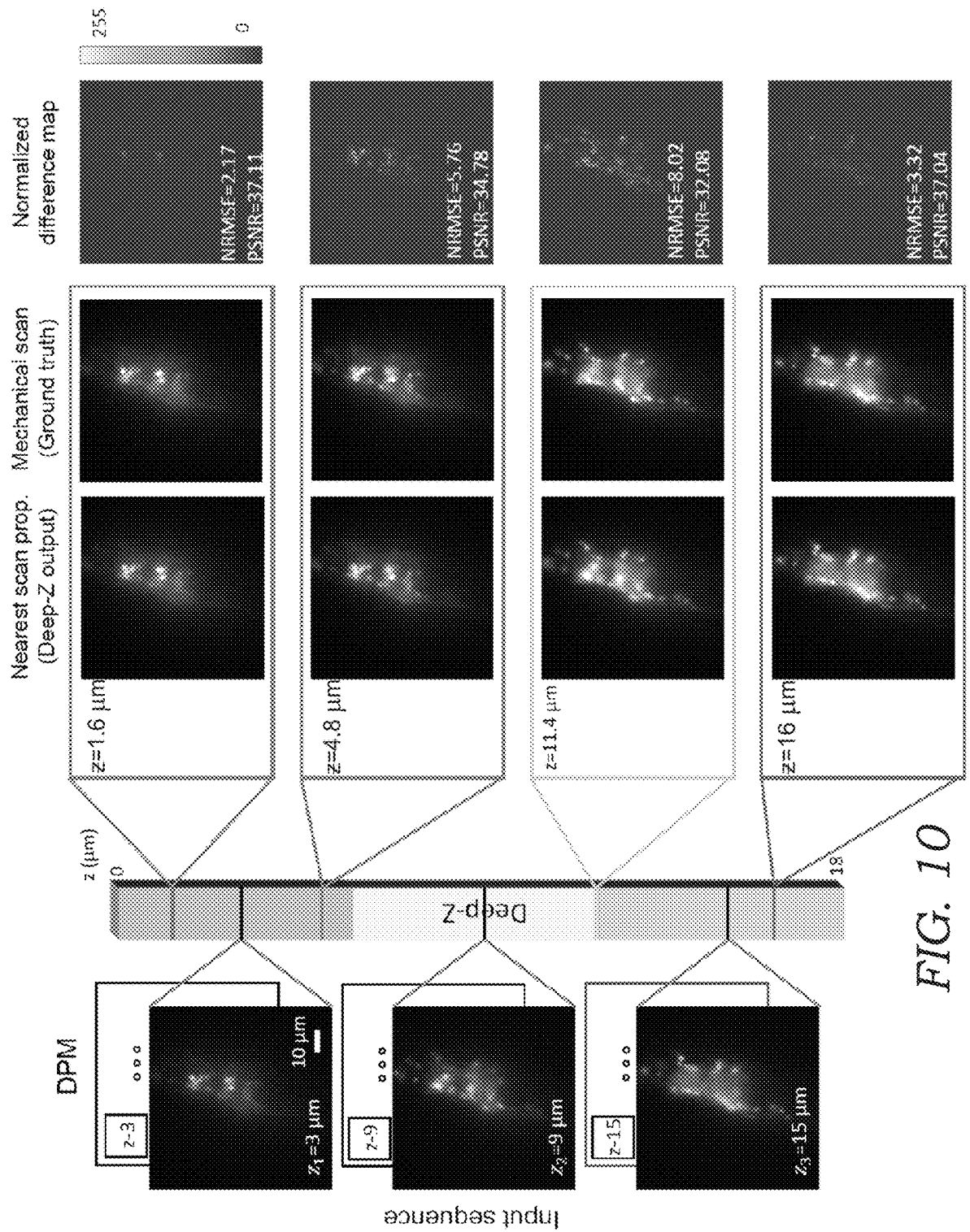
FIG. 10 illustrates a volumetric image reconstruction using Deep-Z on a *C. elegans* sample. Deep-Z takes in a single input image to infer an output image at the designated plane. See FIG. 3 for a comparison against Recurrent-MZ.
Figures 11A, 11B:
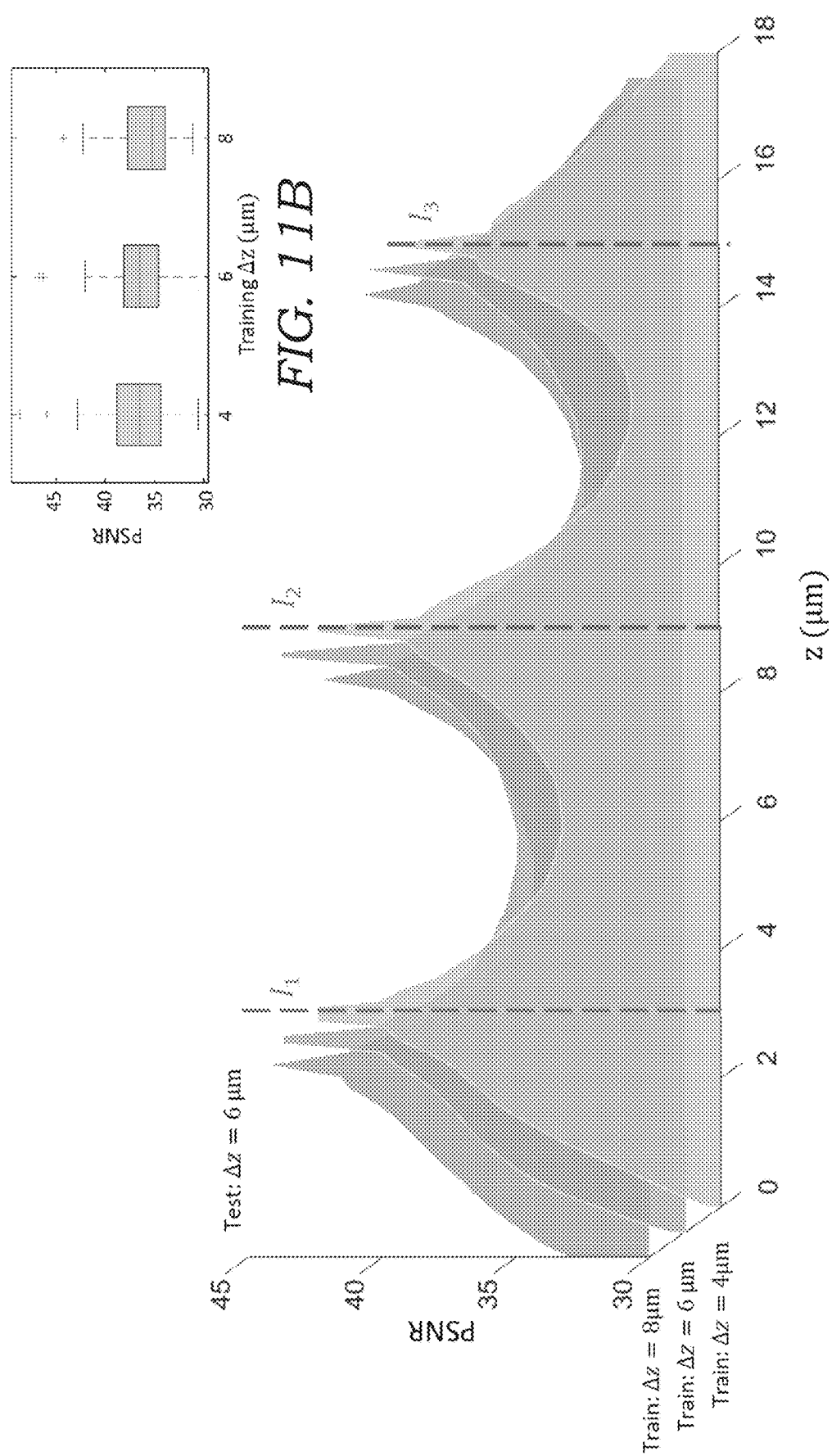
FIGS. 11A-11B illustrate the influence of hyperparameter Δz on Recurrent-MZ inference.
Figures 12A, 12B, 12C, 12D:
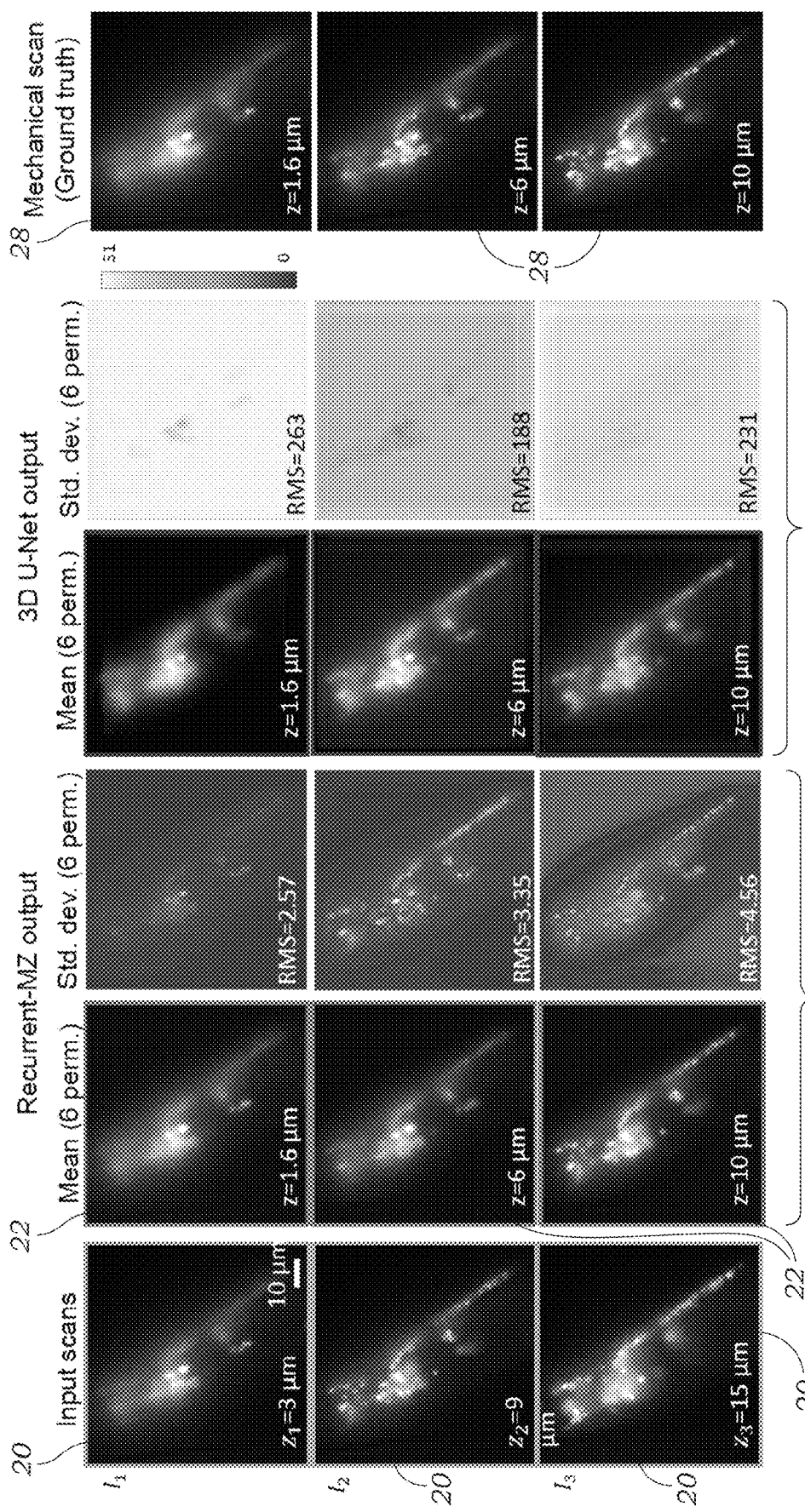
FIGS. 12A-12E illustrate input image permutation invariance of Recurrent-MZ compared against the failure of 3D U-Net due to input image permutations. Recurrent-MZ (M=3) and 3D U-Net were trained with inputs sorted by z and blindly tested on new samples with six (6) random permutations of the input images.
Figure 12E:
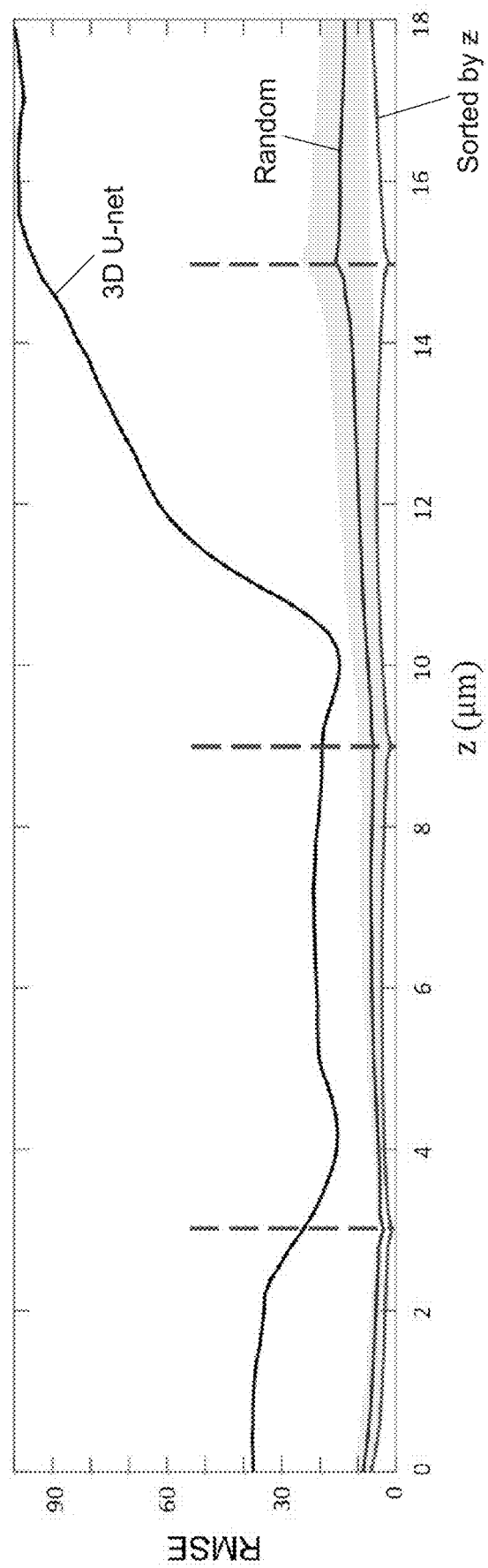
Figure 13A:
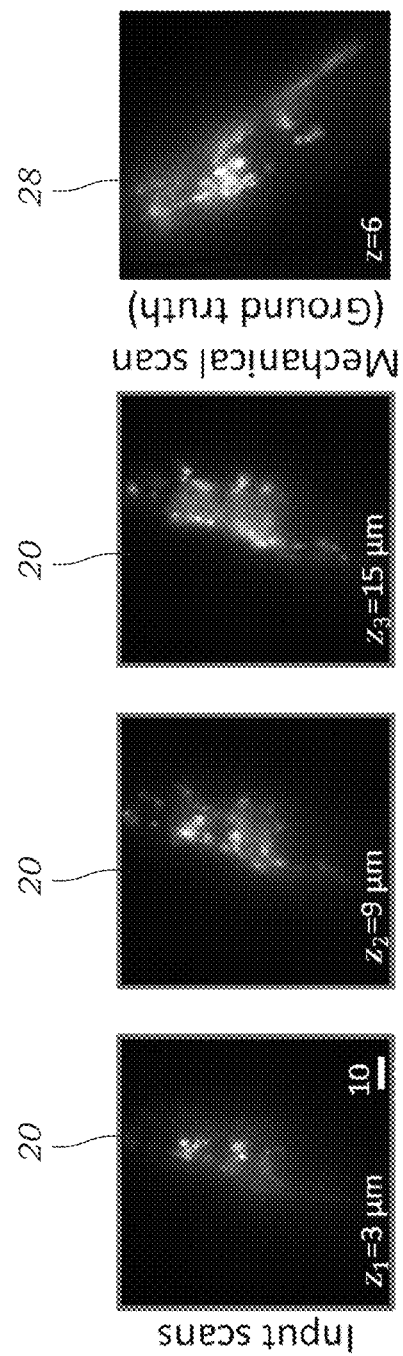
FIGS. 13A-13D illustrate recurrent-MZ inference performance with different training schemes.
Figure 13B:
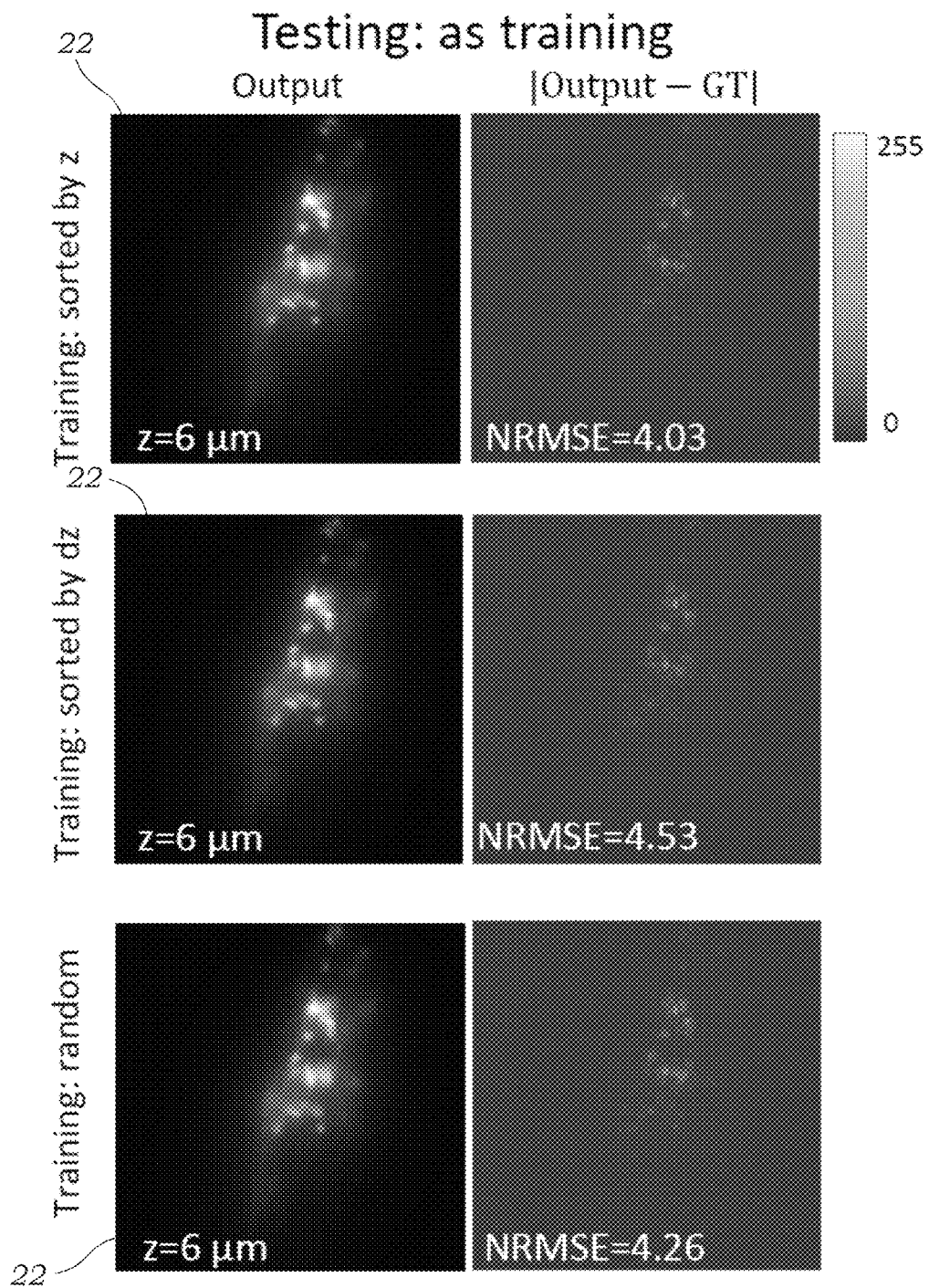
Figure 13C:
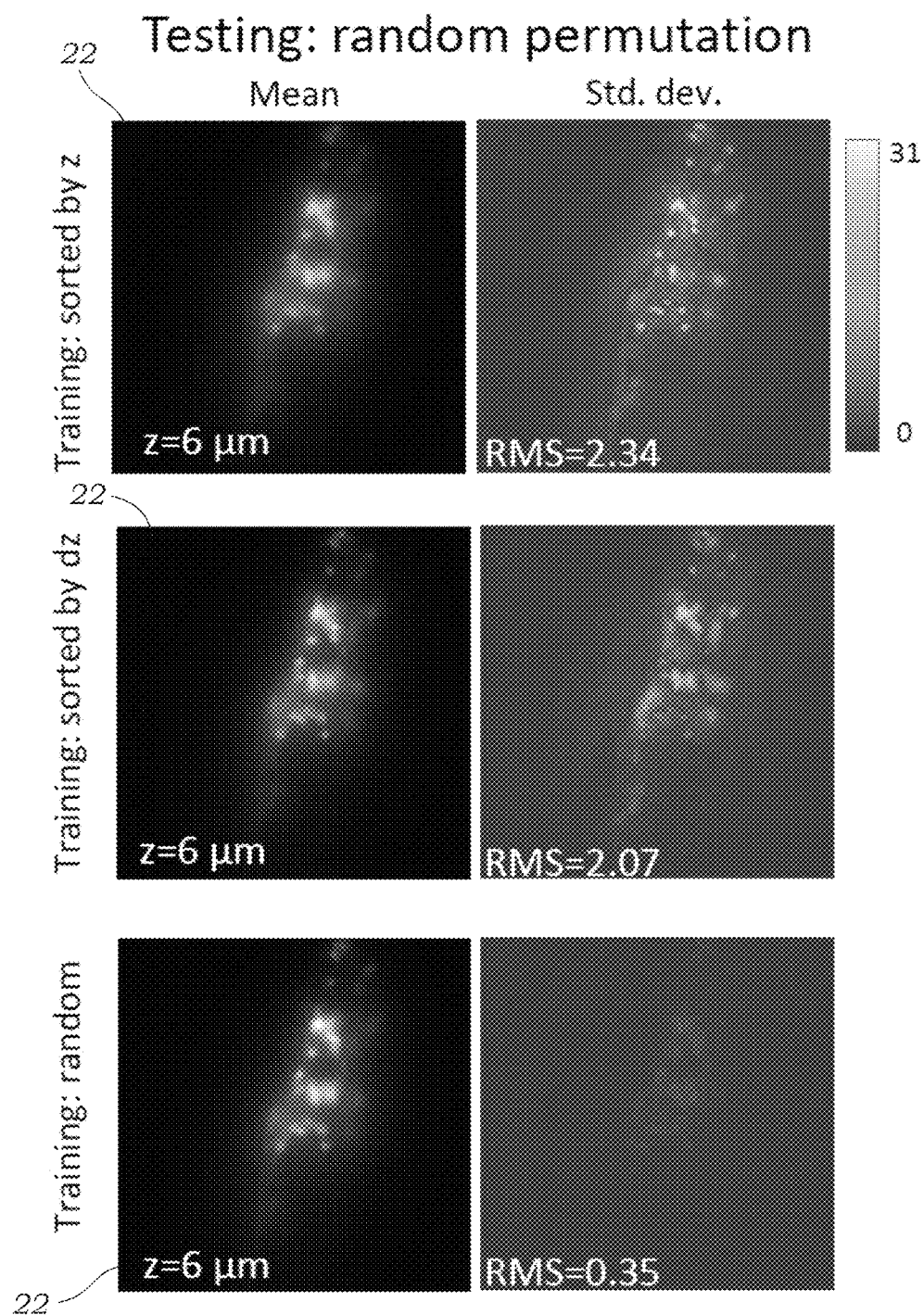
Figure 13D:
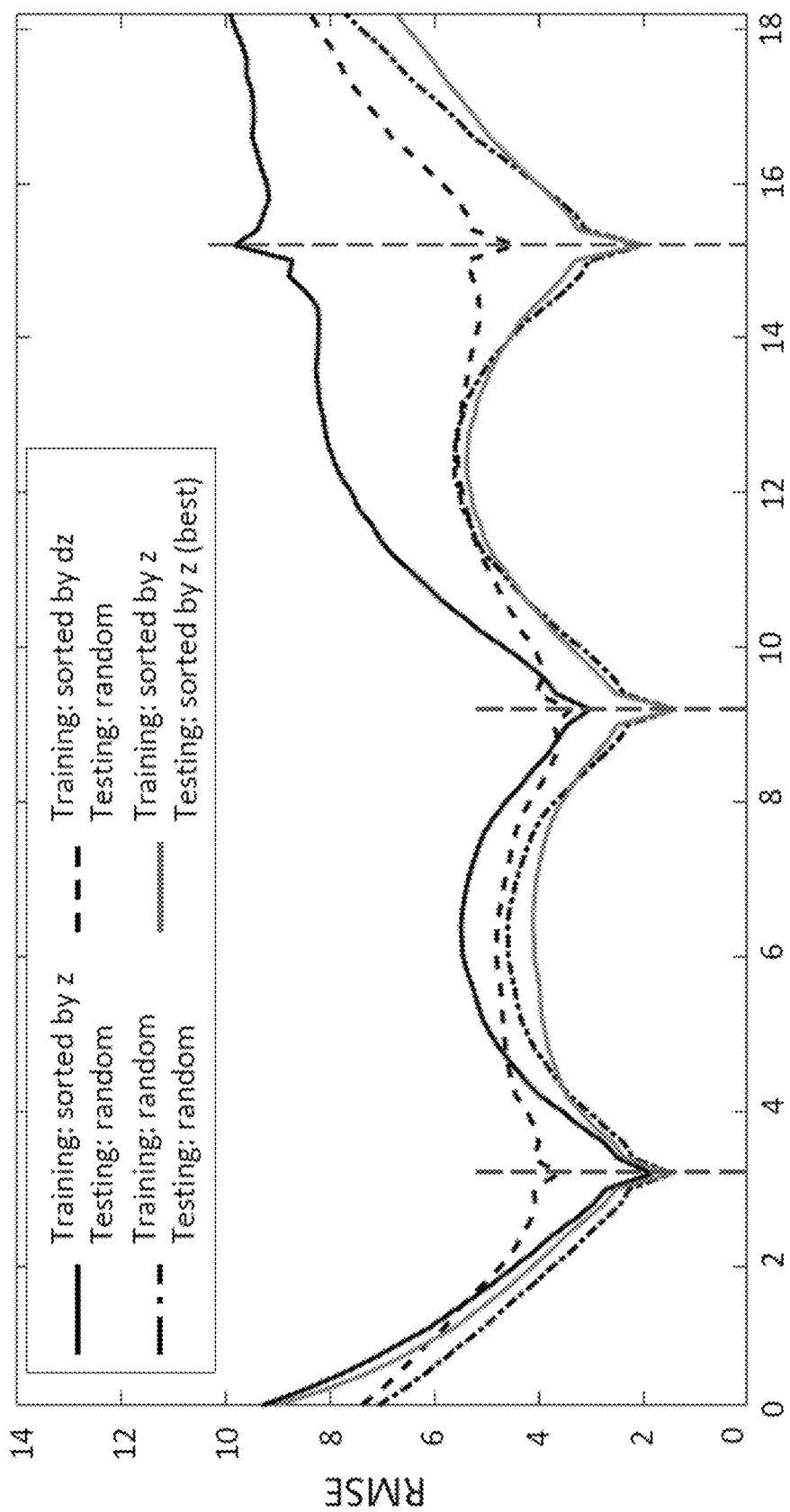

FIGS. 4A-4B also reports the comparison of Recurrent-MZ network 10 inference results with respect to another fluorescence image propagation network termed Deep-Z. See Y. Wu et al., "Three-dimensional virtual refocusing of fluorescence microscopy images using deep learning," Nat Methods 16, 1323-1331 (2019). Deep-Z is designed for taking a single 2D image as input, and therefore there is an inherent trade-off between the propagation quality and the axial refocusing range (from a given focal plane), which ultimately limits the effective volumetric space-bandwidth-product (SBP) that can be achieved using Deep-Z. In this comparison between Recurrent-MZ and Deep-Z (FIG. 4A), the nearest input image is used for Deep-Z based propagation; in other words, three non-overlapping volumes are separately inferred using Deep-Z from the input scans at z=3, 6 and 9 µm, respectively (this provides a fair comparison against Recurrent-MZ with M=3 input images). As illustrated in FIG. 4B, Deep-Z inference resulted in a mean FWHM of 0.4185 µm and a KL divergence of 2.3334, which illustrate the inferiority of single-image-based volumetric propagation, when compared to the results of Recurrent-MZ network 10. The same conclusion regarding the performance comparison of the Recurrent-MZ network 10 and Deep-Z inference is further supported using the *C. elegans* imaging data reported in FIG. 3 (Recurrent-MZ) and in FIG. 10 (Deep-Z). For example, Deep-Z inference results in an NRMSE of 8.02 and a PSNR of 32.08, while Recurrent-MZ (M=2) improves the inference accuracy, achieving an NRMSE of 6.45 and a PSNR of 33.96.

Generalization of Recurrent-MZ to Non-Uniformly Sampled Input Images

Next, it was demonstrated, through a series of experiments, the generalization performance of the Recurrent-MZ network 10 on non-uniformly sampled input images 20, in contrast to the training regiment, which only included uniformly spaced inputs. These non-uniformly spaced input images 20 (i.e., image planes) were randomly selected from the same testing volume as shown in FIG. 3, with the distance between two adjacent input planes made smaller than the uniform axial spacing used in the training dataset ($\Delta z=6$ µm). Although the Recurrent-MZ network 10 was solely trained with equidistant input scans (i.e., training images 24), it generalized to successfully perform volumetric image propagation using non-uniformly sampled input images 20. For example, as shown in FIG. 5A, the input images 20 of the Recurrent-MZ network 10 were randomly selected at $(z_1, z_2, z_3)=(3, 7.8, 13.6)$ µm, respectively, and the output inference (i.e., output image 22) at z=7.0 µm very well matches the output of Recurrent-MZ that used uniformly sampled inputs acquired at $(z_1, z_2, z_3)=(3, 9, 15)$ µm, respectively. FIG. 5B further demonstrates the inference performance of Recurrent-MZ network 10 using non-uniformly sampled input images 20 throughout the volume of the sample 12. The uniform $\Delta z$ input curve and the non-uniform input curve in FIG. 5B have very similar trends, illustrating the generalization of Recurrent-MZ, despite being only trained with uniformly-sampled input images 20 with a fixed dz.

The effect of the hyperparameter $\Delta z$ on the performance of Recurrent-MZ network 10 was further investigated. For this, three different Recurrent-MZ networks 10 were trained using $\Delta z=4$, 6, and 8 µm, respectively, and then blindly tested on a new input sequence of input images 20 with $\Delta z=6$ µm. FIGS. 1A-11B shows the trade-off between the peak performance and the performance consistency over the inference axial range: by decreasing $\Delta z$, the Recurrent-MZ network 10 demonstrates a better peak inference performance, indicating that more accurate propagation has been learned from smaller $\Delta z$, whereas the variance of PSNR, corresponding to the performance consistency over a larger axial range, is degraded for smaller $\Delta z$.

Inference Stability of Recurrent-MZ

During the acquisition of the scans of input images 20, inevitable measurement errors are introduced by e.g., PSF distortions and focus drift, which jeopardize both the precision and accuracy of the axial positioning measurements. Hence, it is necessary to take these effects into consideration and examine the stability of the Recurrent-MZ network 10 inference. For this, a Recurrent-MZ network 10 was tested on the same image test set as in FIG. 3, only this time, independent and identically distributed (i.i.d.) Gaussian noise was injected into the DPM 26 of each input image 20, mimicking the measurement uncertainty when acquiring the axial scans. The noise was added to the DPM 26 as follows:

$$Z_{i,noised}=Z_i+z_{d,i}J, \ i=1,2,\ldots,M,$$

where $Z_i$ is the DPM (m×n matrix) of the i-th input image, $z_{d,i} \sim N(0,\sigma^2)$, i=1, 2, ..., M and J is an all-one m×n matrix.

Figure 6A:
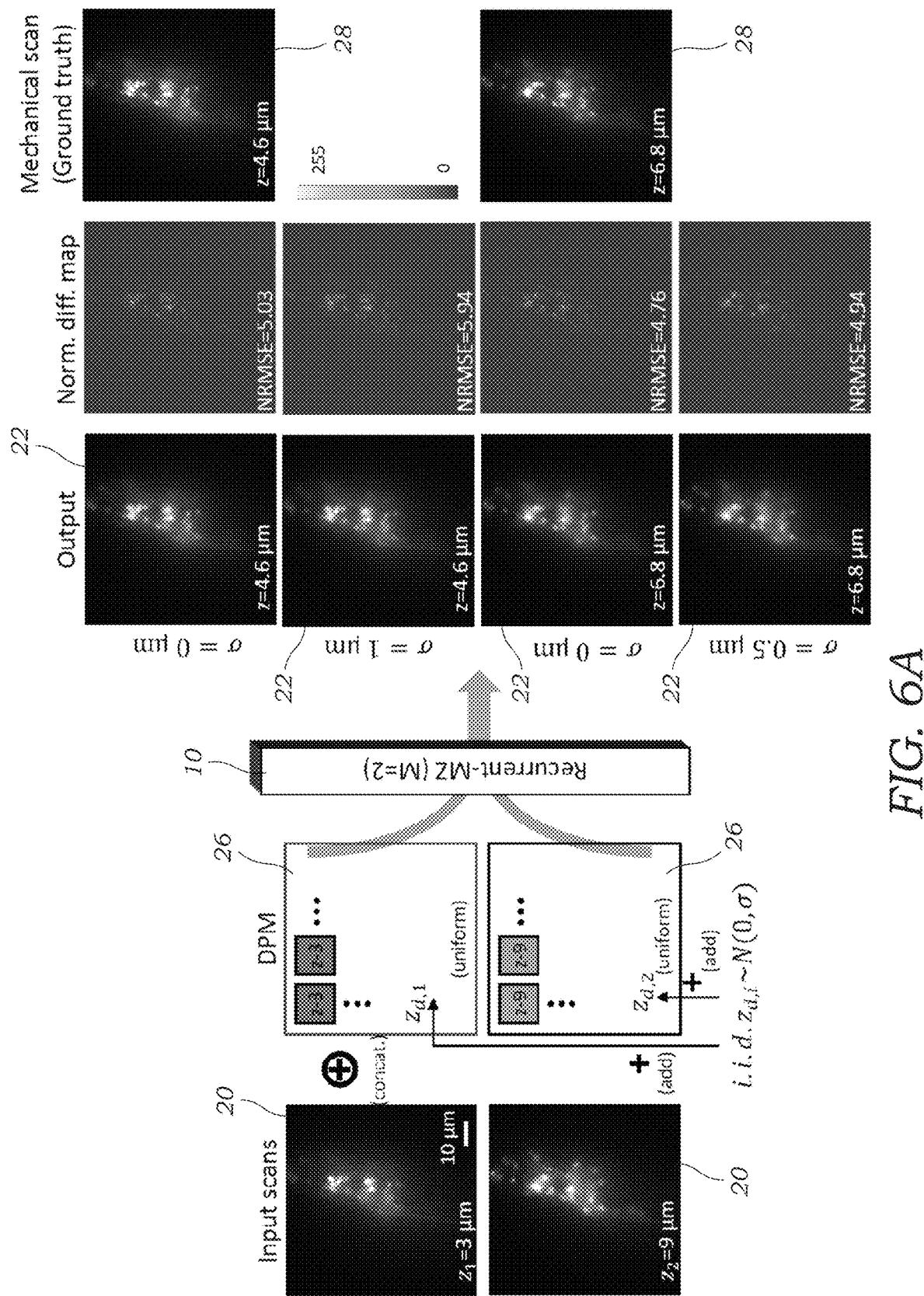
FIGS. 6A-6B illustrate the stability test of Recurrent-MZ inference.
Figure 6B:
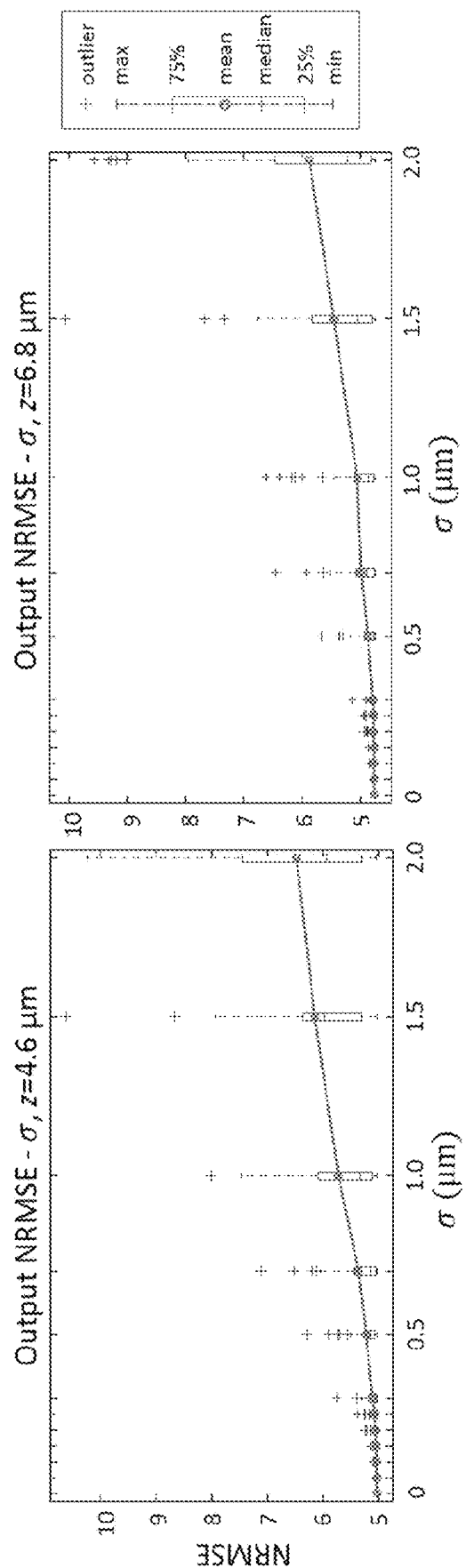

The results of this noise analysis reveal that, as illustrated in FIGS. 6A and 6B, the output images 22 of Recurrent-MZ network 10 (M=2) degrade as the variance of the injected noise increases, as expected. However, even at a relatively significant noise level, where the microscope stage or sample drift is represented with a standard variation of σ=1 μm (i.e., 2.5-fold of the objective lens depth-of-field, 0.4 μm), Recurrent-MZ inference successfully matches the ground truth with an NRMSE of 5.94; for comparison, the baseline inference (with σ=0 μm) has an NRMSE of 5.03 (FIG. 6B), which highlights the resilience of Recurrent-MZ framework against axial scanning errors and/or uncontrolled drifts in the sample/stage.

Permutation Invariance of Recurrent-MZ

Figures 7A, 7B, 7C, 7D:
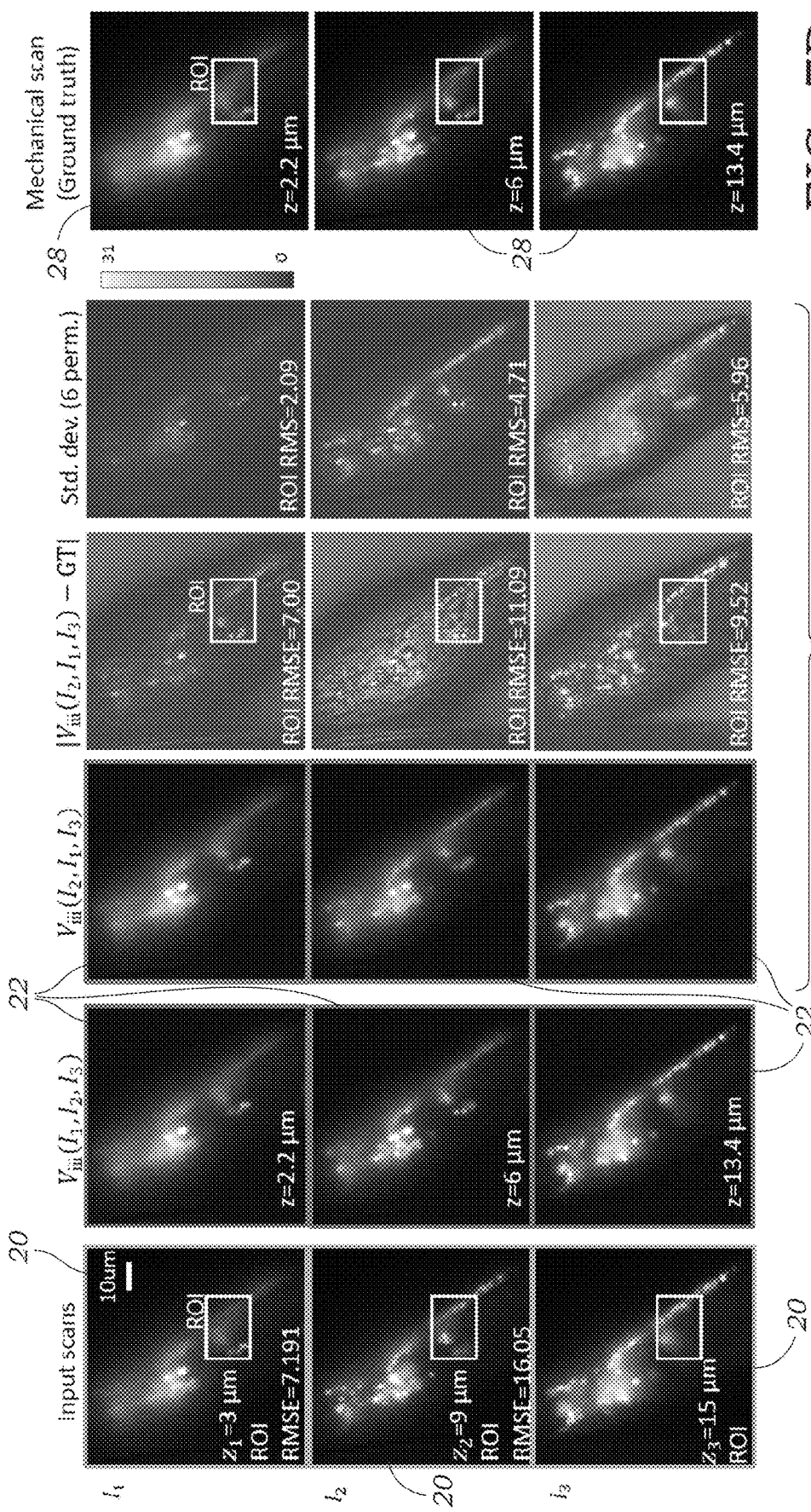
FIGS. 7A-7E illustrate the permutation invariance of Recurrent-MZ to the input images. The Recurrent-MZ network was trained with inputs (M=3) sorted by z and tested on new samples with both inputs sorted by z as well as 6 random permutations of the same inputs to test its permutation invariance.
Figure 7E:
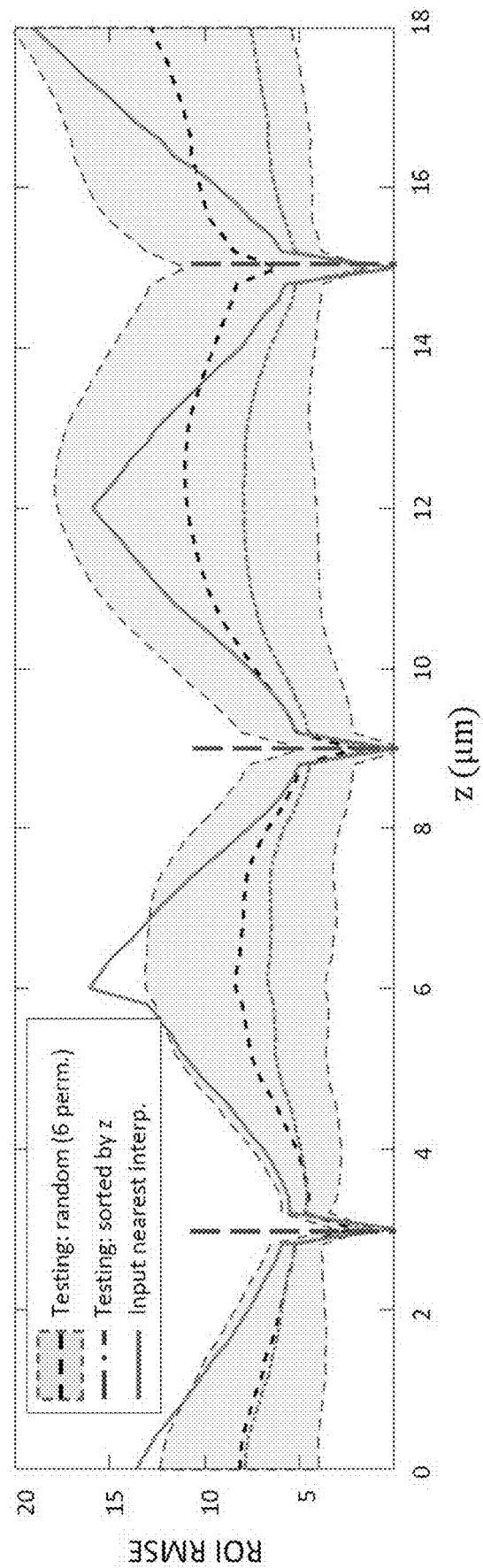

Next, post hoc interpretation of the Recurrent-MZ framework was done, without any modifications to its design or the training process. For this, it was explored to see if Recurrent-MZ network 10 exhibits permutation invariance, i.e., $$V_M(I_1,I_2,\ldots,I_M)=V_M(I_{i_1},I_{i_2},\ldots,I_{iM}), \forall (i_1,i_2,\ldots,i_M) \in S_M,$$

where $S_M$ is the permutation group of M. To explore the permutation invariance of the Recurrent-MZ network 10 (see FIGS. 7A-7E), the test set's input images 20 were randomly permuted, and fed into the Recurrent-MZ network 10 (M=3), which was solely trained with input images 24 sorted by z. Next, Recurrent-MZ outputs (i.e., output images 22) were quantified over all the six (6) permutations of the M=3 input images 20, using the average RMSE ($\mu_{RMSE}$) and the standard variance of the RMSE ($\sigma_{RMSE}$), calculated with respect to the ground truth image 28 (herein represented by I):

$$\mu_{RMSE} = \frac{1}{6}\sum_{(i_1,i_2,i_3) \in S_3} RMSE(V_{iii}(I_{i_1},I_{i_2},I_{i_3}),I),$$

$$\sigma_{RMSE} = \sqrt{\frac{1}{6}\sum_{(i_1,i_2,i_3) \in S_3}(RMSE(V_{iii}(I_{i_1},I_{i_2},I_{i_3}),I)-\mu_{RMSE})^2},$$

where RMSE (I, J) gives the RMSE between image I and J. In FIG. 7E, the dashed line (testing:random) indicates the average RMSE over six (6) permutations and the shaded region indicates the standard deviation of RMSE over these six (6) permutations. RMSE and RMS values were calculated based on the highlighted regions of interest (ROIs). Compared with the dash-dot line (testing: sorted by z) in FIG. 7E, which corresponds to the output of the Recurrent-MZ network 10 with the inputs sorted by z, the input image permutation results highlight the success of the Recurrent-MZ network 10 with different input image 20 sequences, despite being trained solely by depth sorted inputs. In contrast, non-recurrent convolution neural network (CNN) architectures, such as 3D U-Net, inevitably lead to input permutation instability as they require a fixed length and sorted input sequences; this failure of non-recurrent CNN architectures is illustrated in FIGS. 12A-12E.

Different training schemes were explored to further improve the permutation invariance of the Recurrent-MZ network 10, including training with input images 24 sorted in descending order by the relative distance (dz) to the output plane as well as randomly sorted input images 24. As shown in FIGS. 13A-13D, the Recurrent-MZ network 10 trained with input images 24 that are sorted by depth, z, achieves the best inference performance, indicated by an NRMSE of 4.03, whereas incorporating randomly ordered inputs in the training phase results in the best generalization for different input image permutations. The analyses reported in FIGS. 13A-13D further highlight the impact of different training schemes on the inference quality and the permutation invariance feature of the resulting trained Recurrent-MZ network 10.

Repetition Invariance of Recurrent-MZ

Figures 8A, 8B:
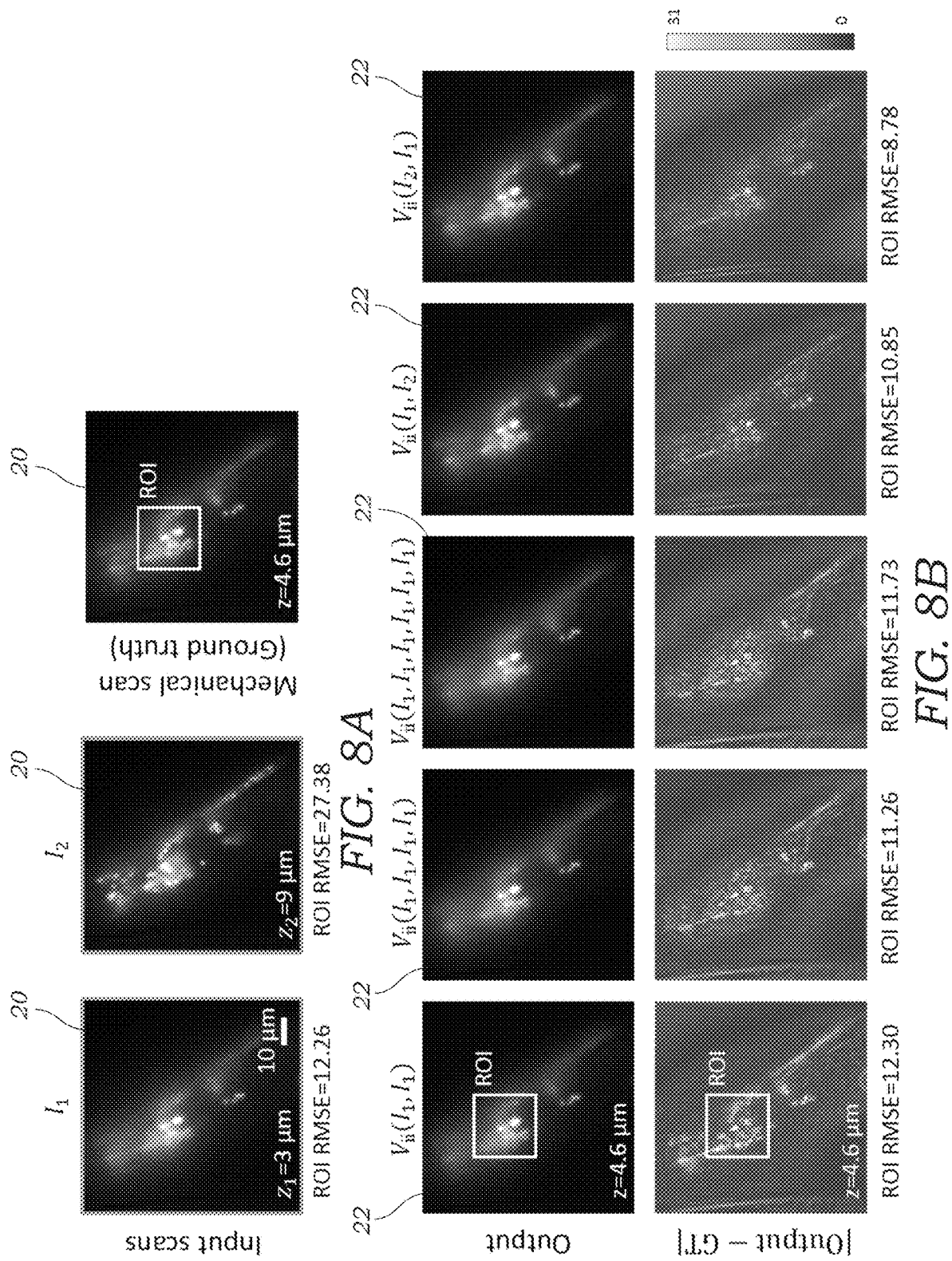
FIGS. 8A-8C illustrate the repetition invariance of Recurrent-MZ. The Recurrent-MZ network was trained with inputs (M=2) sorted by their relative distances (dz) to the output plane, but tested on a new sample by repeatedly feeding the input image ($I_1$) to test its repetition invariance.
Figure 8C:
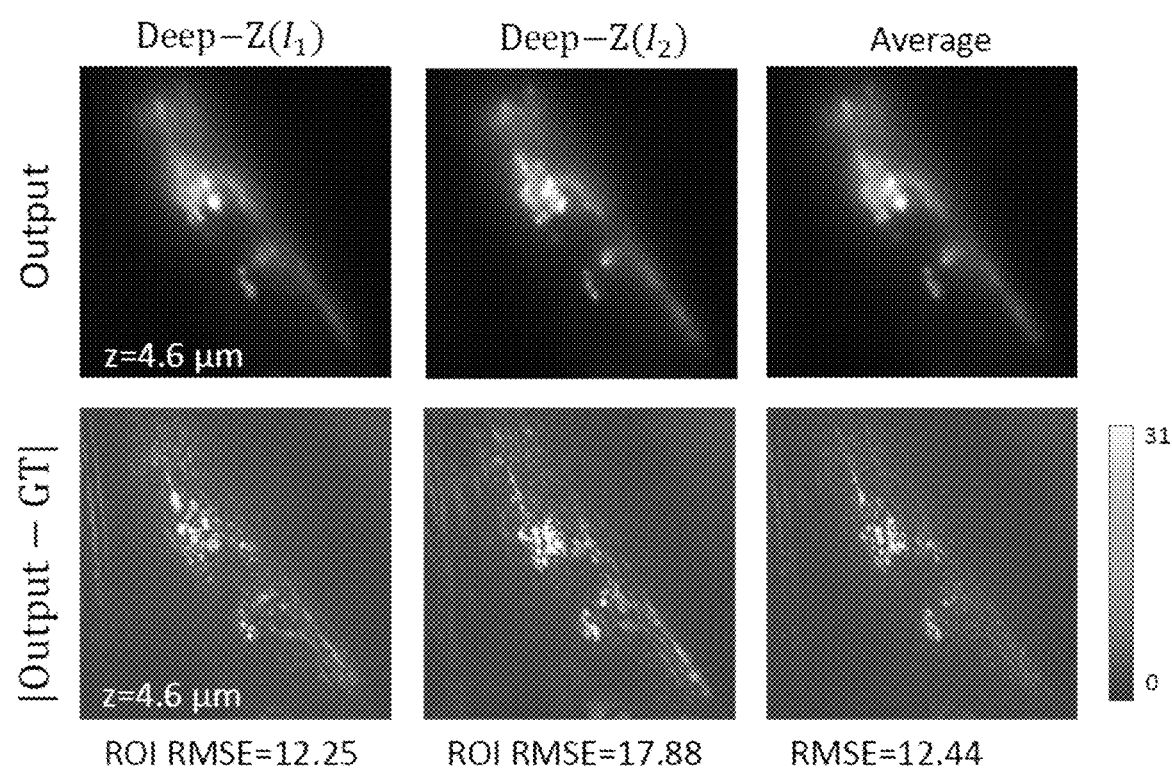
Figure 14A:
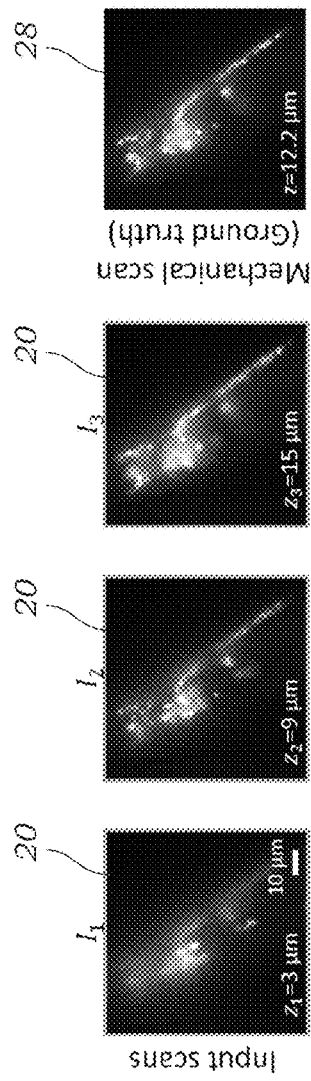
FIGS. 14A-14C illustrate repetition invariance of Recurrent-MZ. Recurrent-MZ (M=3) was trained with input sequences with 3 input images ($I_1$, $I_2$ and $I_3$), but tested by repeatedly feeding the input image ($I_3$).
Figure 14B:
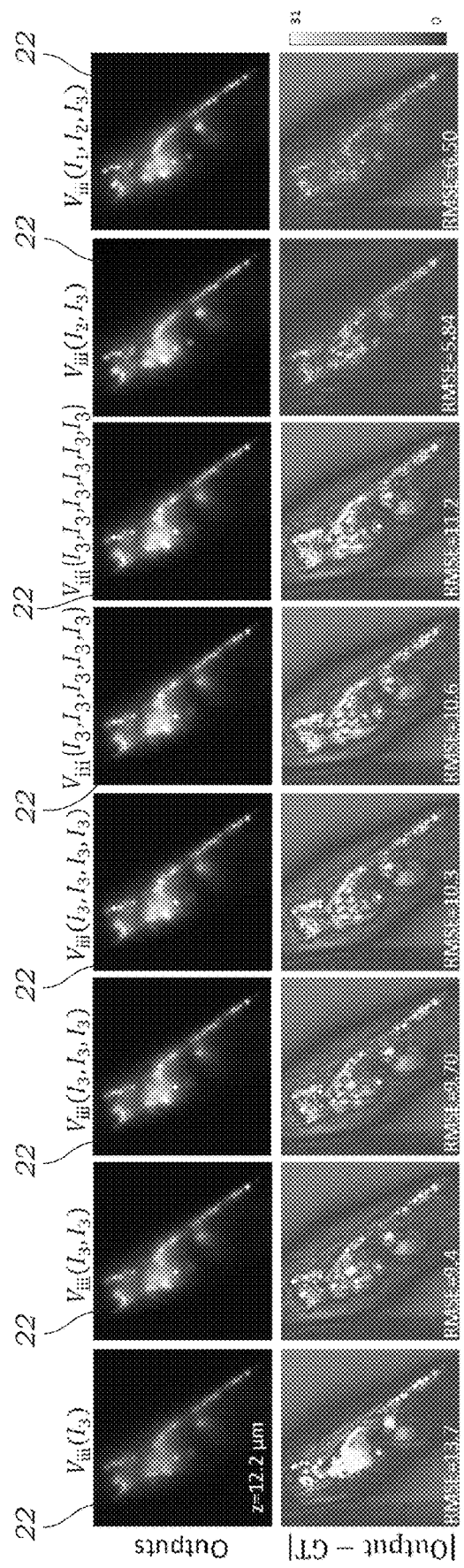
Figure 14C:
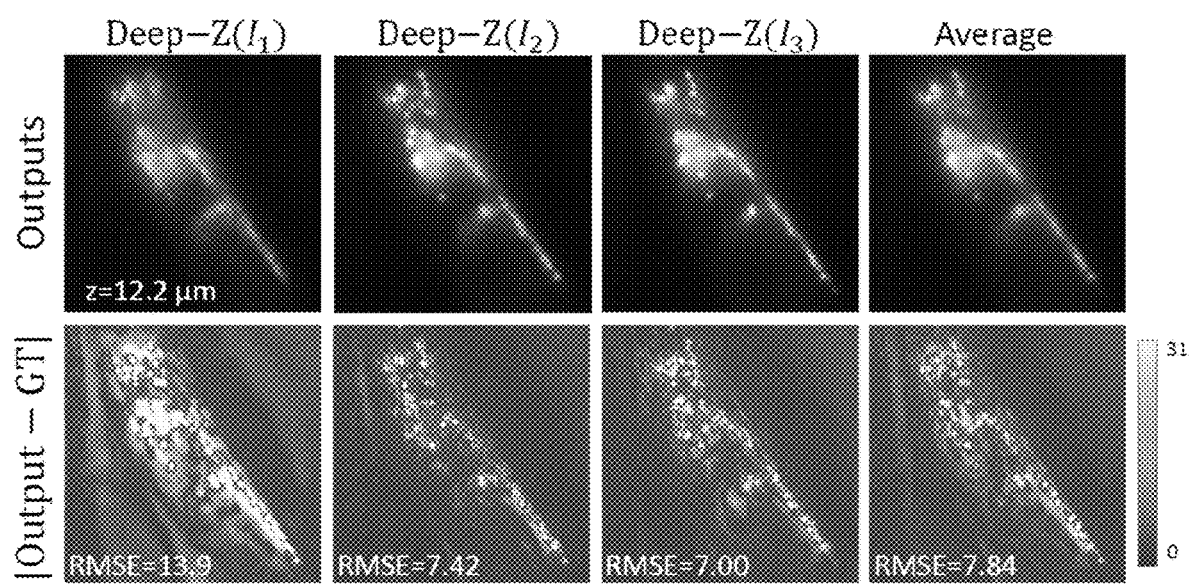

Next, it was explored to determine if the Recurrent-MZ network 10 exhibits repetition invariance. FIGS. 8A-8C demonstrates the repetition invariance of Recurrent-MZ network 10 when it was repeatedly fed with input image 20 ($I_1$). The output images 22 of Recurrent-MZ network 10 in FIG. 8B show its consistency for 2, 4 and 6 repetitions of $I_1$, i.e., $V_{ii}(I_1, I_1)$, $V_{ii}(I_1, I_1, I_1, I_1)$ and $V_{ii}(I_1, I_1, I_1, I_1, I_1, I_1)$, which resulted in an RMSE of 12.30, 11.26 and 11.73, respectively. Although the Recurrent-MZ network 10 was never trained with repeated input images, its recurrent scheme still demonstrates the correct propagation under repeated inputs of the same 2D plane. When compared with the output of Deep-Z (i.e., Deep-Z($I_1$)) shown in FIG. 8C, the Recurrent-MZ network 10, with a single input image 20 or its repetitions, exhibits comparable reconstruction quality. FIGS. 14A-14C also presents a similar comparison when M=3, further supporting the same conclusion.

While for a single input image 20 ($I_1$ or its repeats) the blind inference performance of Recurrent-MZ network 10 is on par with Deep-Z($I_1$), the incorporation of multiple input planes gives a superior performance to the Recurrent-MZ network 10 over Deep-Z. As shown in the last two columns of FIG. 8B, by adding another depth image, $I_2$, the output of the Recurrent-MZ network 10 is significantly improved, where the RMSE decreased to 8.78; this represents a better inference performance compared to Deep-Z($I_1$) and Deep-Z($I_2$) as well as the average of these two Deep-Z outputs (see FIGS. 8B-8C). The same conclusion is further supported in FIGS. 14B-14C for M=3, demonstrating that the Recurrent-MZ network 10 is able to outperform Deep-Z even if all of its M input images are individually processed by Deep-Z and averaged, showing the superiority of the presented recurrent inference framework.

Demonstration of Cross-Modality Volumetric Imaging: Wide-Field to Confocal

Figure 15A:
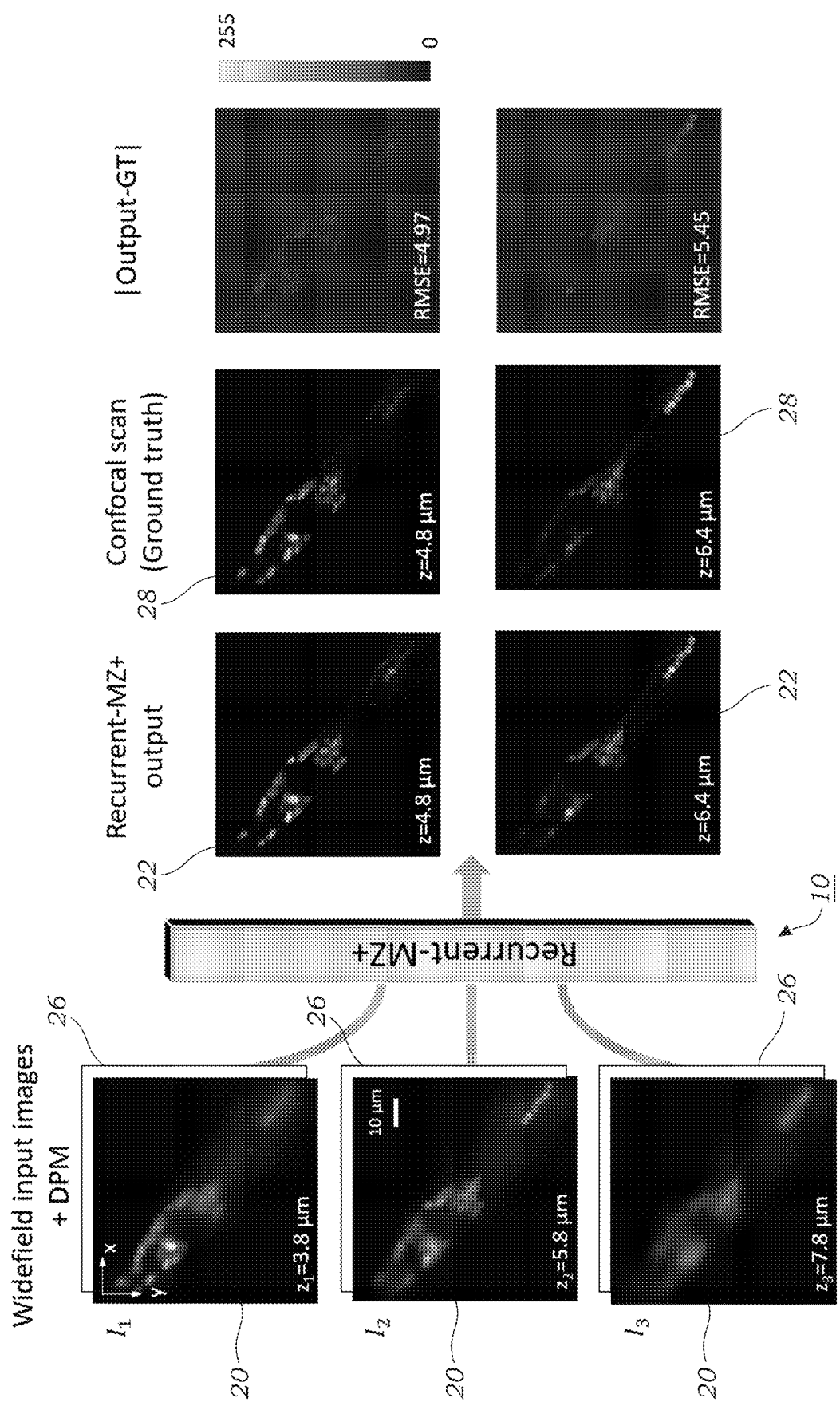
FIGS. 15A-15B illustrate an embodiment of the Recurrent-MZ+ network used to perform cross-modality volumetric imaging (e.g., wide-field to confocal).
Figure 15B:
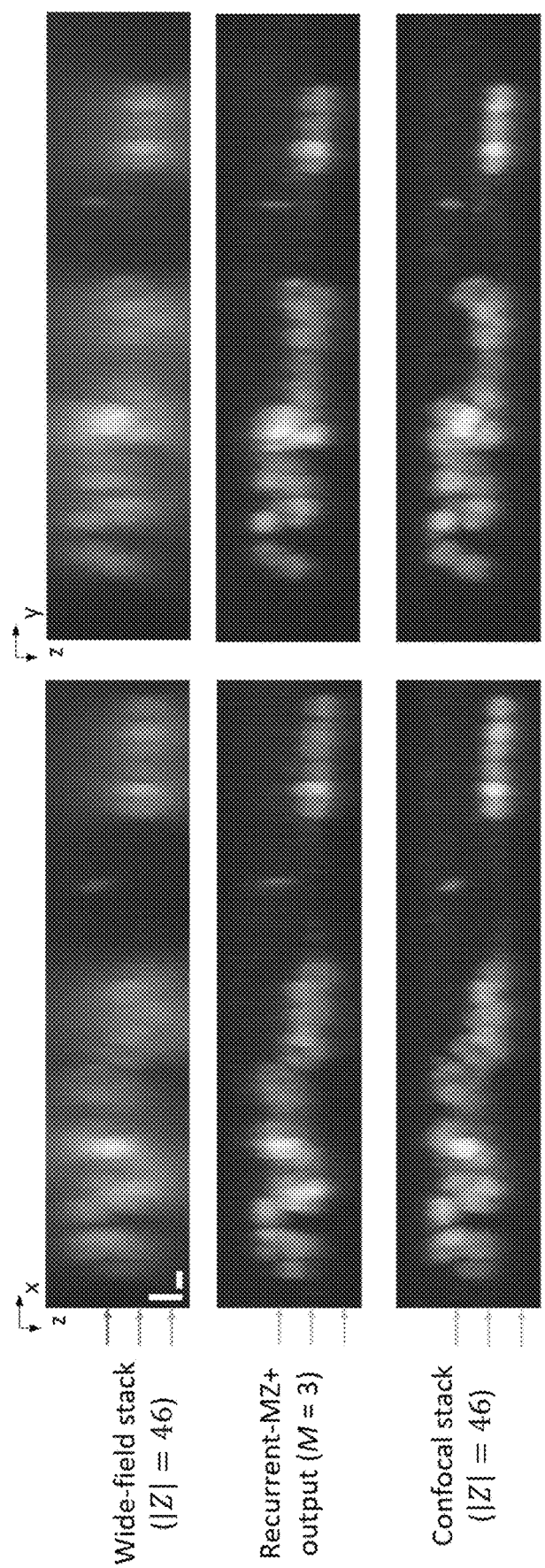

The presented Recurrent-MZ framework and resulting trained neural network 10 can also be applied to perform cross-modality volumetric imaging, e.g., from wide-field image modality to confocal image modality, where the network 10 takes in a few wide-field 2D fluorescence images 20 (input) to infer at its output a volumetric image stack 22, matching the fluorescence images of the same sample 12 obtained by a confocal microscope 110. This this cross-modality image transformation framework is referred to as Recurrent-MZ+. To experimentally demonstrate this unique capability, a Recurrent-MZ+ network 10 was trained using wide-field (input) training images 24 and confocal (ground truth) images 28 pairs corresponding to C. elegans samples 12. FIGS. 15A and 15B report blind-testing results on new images 20 never used in the training phase. In FIGS. 15A, 15B, M=3 wide-field images 20 captured at z=2.8, 4.8, and 6.8 μm were fed into Recurrent-MZ+ network 10 as input images 20 and were virtually propagated onto axial planes from 0 to 9 μm with 0.2 μm spacing; the resulting Recurrent-MZ+ output images 22 provided a very good match to the corresponding confocal 3D image stack obtained by mechanical scanning. FIG. 15B further illustrates the maximum intensity projection (MIP) side views (x-z and y-z), showing the high fidelity of the reconstructed image stack by Recurrent-MZ+ with respect to the mechanical confocal scans. In contrast to the wide-field image stack of the same sample 12 (with 46 image scans), where only a few neurons can be recognized in the MIP views with deformed shapes, the reconstructed image stack generated by the Recurrent-MZ+ network 10 shows substantially sharper MIP views using only M=3 input images 20, and also mitigates the neuron deformation caused by the elongated wide-field PSF, providing a comparable image quality with respect to the confocal microscopy image stack.

The Recurrent-MZ networks 10 described herein are enabled by a convolutional recurrent neural network, which extends the DOF of the microscope device 110 by around 50-fold from sparse 2D scanning, providing a 30-fold reduction in the number of required mechanical scans. Another advantage of the Recurrent-MZ network 10 is that it does not require special optical components in the microscopy set-up or an optimized scanning strategy. Despite being trained with equidistant input scans, the Recurrent-MZ network 10 successfully generalized to use input images 20 acquired with a non-uniform axial spacing as well as unknown axial positioning errors, all of which demonstrate its robustness.

In a practical application, the users of the Recurrent-MZ network 10 should select an optimum M to provide a balance between the inference image quality of the reconstructed sample volume and the imaging throughput. For example, it is possible to set a stopping threshold, E, for the volumetric reconstruction improvement that is provided by adding another image/scan to the Recurrent-MZ network 10, in terms of the Euclidean distance from the volume which was reconstructed from previous images; stated differently, the scanning can stop when e.g., $\|V_M(I_1, \ldots, I_M) - V_{M-1}(I_1, \ldots, I_{M-1})\|_F \leq \epsilon$, where $\|\bullet\|_F$ defines the Frobenius norm.

The results disclosed herein show the benefits of using convolutional recurrent neural networks in microscopic image reconstruction, and also reveals the potential of RNNs in microscopic imaging when sequential image data are acquired. With regards to solving inverse problems in microscopic imaging, most existing deep learning-based methods are optimized for a single shot/image, whereas sequential shots are generally convenient to obtain and substantial sample information hides in their 3D distribution. By incorporating of sequential 2D scans, the presented Recurrent-MZ network 10 integrates the information of different input images 20 from different depths of the sample 12 to gain considerable improvement in the volumetric image quality and the output DOF. In contrast to 3D convolutional neural networks that generally require a fixed sampling grid, the presented recurrent scheme is compatible with input sequences of variable lengths, as shown in FIGS. 8A-8B. Another interesting property that was demonstrated is the robustness of the Recurrent-MZ network 10 in terms of its resilience to input image 20 permutations (FIGS. 7A-7E), which could lead to catastrophic failure modes for standard convolutional networks, as also illustrated in FIGS. 12A-12E.

Recurrent-MZ networks 10 provide a rapid and flexible volumetric imaging framework with reduced number of axial scans, and opens up new opportunities in machine learning-based 3D microscopic imaging. The presented recurrent neural network structure could also be widely applicable to process sequential data resulting from various other 3D imaging modalities such as OCT, Fourier ptychographic microscopy, holography, structured illumination microscopy, among others.

Methods

Sample Preparation, Image Acquisition and Dataset Preparation

The *C. elegans* samples were firstly cultured and stained with GFP using the strain AML18. AML18 carries the genotype wtfIs3 [rab-3p::NLS::GFP+rab-3p::NLS::tagRFP] and expresses GFP and tagRFP in the nuclei of all the neurons. *C. elegans* samples were cultured on nematode growth medium seeded with OP50 *E. Coli* bacteria using standard conditions. During the imaging process, the samples were washed off the plates with M9 solution and anesthetized with 3 mM levamisole, and then mounted on slides seeded with 3% agarose.

The images of *C. elegans* were captured by an inverted scanning microscope (TCS SP8, Leica Microsystems), using a 63×/1.4 NA objective lens (HC PL APO 63×/1.4 NA oil CS2, Leica Microsystems) and a FITC filter set (excitation/emission wavelengths: 495 nm/519 nm), resulting in a DoF about 0.4 μm. A monochrome scientific CMOS camera (Leica DFC9000GTC-VSC08298) was used for imaging where each image has 1024×1024 pixels and 12-bit dynamic range. For each FOV, 91 images with 0.2 μm axial spacing were recorded. A total of 100 FOVs were captured and exclusively divided into training, validation and testing datasets at the ratio of 41:8:1, respectively, where the testing dataset was strictly captured on distinct worms that were not used in training dataset.

The nanobead image dataset consists of wide-field microscopic images that were captured using 50 nm fluorescence beads with a Texas Red filter set (excitation/emission wavelengths: 589 nm/615 nm). The wide-field microscopy system consists of an inverted scanning microscope (TCS SP8, Leica Microsystems) and a 63×/1.4 NA objective lens (HC PL APO 63×/1.4 NA oil CS2, Leica Microsystems). Each volume contains 101 images with 0.1 μm axial spacing. A subset of 400, 86 and 16 volumes were exclusively divided as training, validation and testing datasets.

Each captured image volume was first axially aligned using the ImageJ plugin 'StackReg' for correcting the lateral stage shift and stage rotation. Secondly, an image with extended depth of field (EDF) was generated for each volume, using the ImageJ plugin 'Extended Depth of Field.' The EDF image was later used as a reference for the following image processing steps: (1) apply triangle thresholding to the EDF image to separate the background and foreground contents, (2) draw the mean intensity from the background pixels as the shift factor, and the 99% percentile of the foreground pixels as the scale factor, (3) normalize the volume by the shift and scale factors. Thirdly, training FOVs were cropped into small regions of 256×256 pixels without any overlap. Eventually, the data loader randomly selects M images from the volume with an axial spacing of Δz=6 μm (*C. elegans*) and Δz=3 μm (nanobeads) in both the training and testing phases.

Network Structure

The Recurrent-MZ network 10 is based on a convolutional recurrent network design, which combines the advantages of both convolutional neural networks and recurrent neural networks in processing sequential inputs. A common design of the network 10 is formed by an encoder-decoder structure, with the convolutional recurrent units applying to the latent domain Furthermore, inspired by the success of exploiting multiscale features in image translation tasks, a sequence of cascaded encoder-decoder pairs is utilized to exploit and incorporate image features at different scales from different axial positions.

Figure 2B:
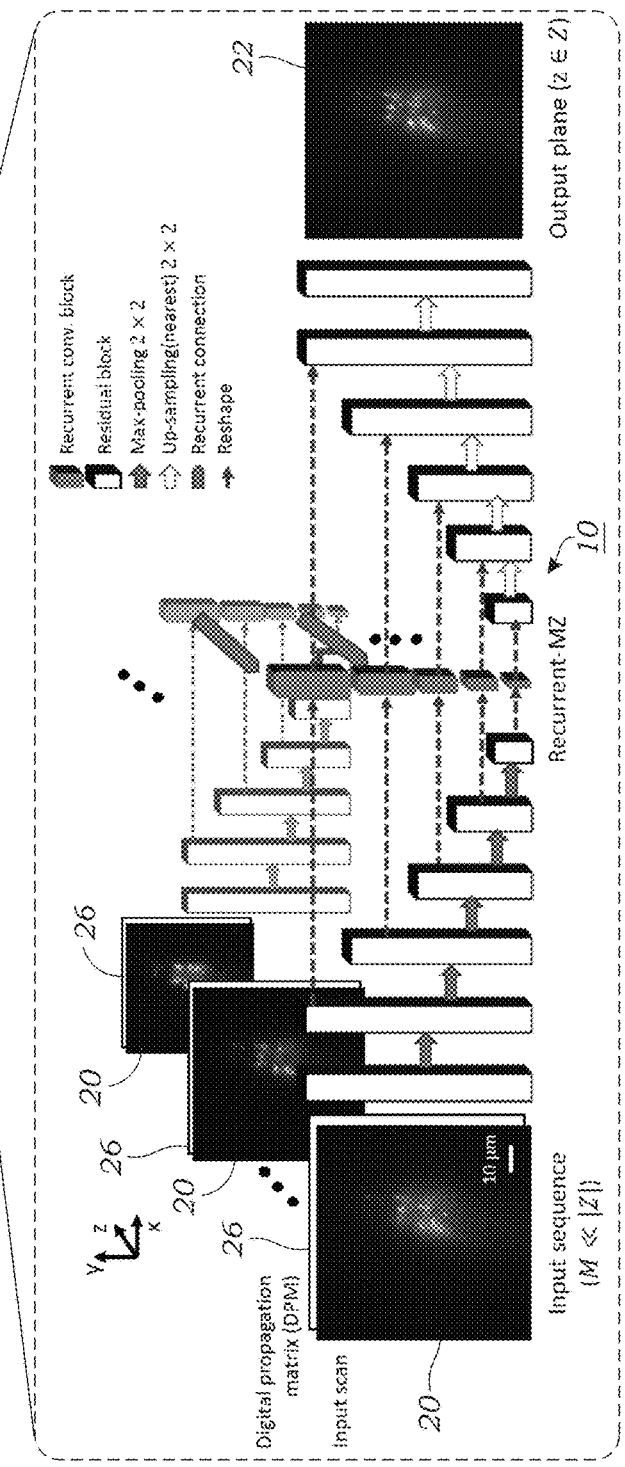
FIG. 2B illustrates the Recurrent-MZ network structure. The network and training details are elucidated in the Methods section. Z is the set of all the axial positions within the target sample volume, composed of |Z| unique axial planes. Typically, M=2 or 3 and |Z|>>M.

As shown in FIG. 2B, the output of last encoder block $x_{k-1}$ is pooled and then fed into the k-th block, which can be expressed as $$x_k = \text{ReLU}(\text{BN}(\text{Conv}_{k,2}(\text{ReLU}(\text{BN}(\text{Conv}_{k,1}(P(x_{k-1})))))) \quad (1)$$

where $P(\cdot)$ is the 2×2 max-pooling operation, $\text{BN}(\cdot)$ is batch normalization, $\text{ReLU}(\cdot)$ is the rectified linear unit activation function and $\text{Conv}_{k,i}(\cdot)$ stands for the i-th convolution layer in the k-th encoder block. The convolution layers in all convolution blocks have a kernel size of 3×3, with a stride of 1, and the number of channels for $\text{Conv}_{k,1}$ and $\text{Conv}_{k,2}$ are $20 \cdot 2^{k-2}$ and $20 \cdot 2^{k-1}$, respectively. Then, $x_k$ is sent to the recurrent block, where features from the sequential input images are recurrently integrated:

$$s_k = x_k + \text{ConV}_{k,3}(\text{RConV}_k(x_k)) \quad (2)$$

where $\text{RConv}_k(\cdot)$ is the convolutional recurrent layer with kernels of 3×3 and a stride of 1, the $\text{Conv}_{k,3}(\cdot)$ is a 1×1 convolution layer. Finally, at the decoder part, $s_k$ is concatenated with the up-sampled output from last decoder convolution block, and fed into the k-th decoder block, so the output of k-th decoder block can be expressed as $$y_k = \text{ReLU}(\text{BN}(\text{Conv}_{k,5}(\text{ReLU}(\text{BN}(\text{Conv}_{k,4}(I(y_{k-1}) \oplus s_k))))))_j \quad (3)$$

where $\oplus$ is the concatenation operation, $I(\cdot)$ is the 2×2 up-sampling operation using nearest interpolation and $\text{Conv}_{k,i}(\cdot)$ are the convolution layers of the k-th decoder block.

In this work, the gated recurrent unit (GRU) is used as the recurrent unit, i.e., the $\text{RConv}(\cdot)$ layer in Eq. (2) updates $h_t$, given the input $x_t$, through the following three steps:

$$f_t = \sigma(W_f * x_t + U_f * h_{t-1} + b_f) \quad (4)$$

$$\hat{h}_t = \tanh(W_h * x_t + U_h * (f_t \odot h_{t-1}) + b_h) \quad (5)$$

$$h_t = (1-f_t) \odot h_{t-1} + f_t \odot \hat{h}_t \quad (6)$$

where $f_t$, $h_t$ are forget and output vectors at time step t, respectively, $W_f$, $W_h$, $U_f$, $U_h$ are the corresponding convolution kernels, $b_f$, $b_h$ are the corresponding biases, $\sigma$ is the sigmoid activation function, $*$ is the 2D convolution operation, and $\odot$ is the element-wise multiplication. Compared with long short-term memory (LSTM) network, GRU entails fewer parameters but is able to achieve similar performance.

Figure 2C:
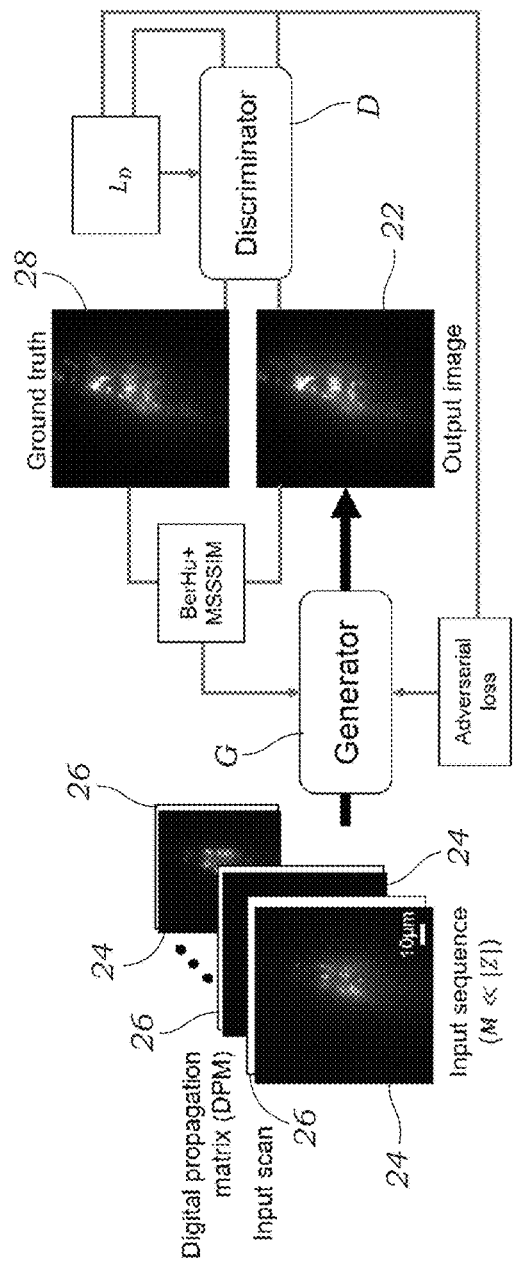
FIG. 2C illustrates the detailed network structure of the GAN structure and data flow of the Recurrent-MZ network. The Recurrent-MZ network is trained using the discriminator network also illustrated in FIG. 2D.
Figure 2D:
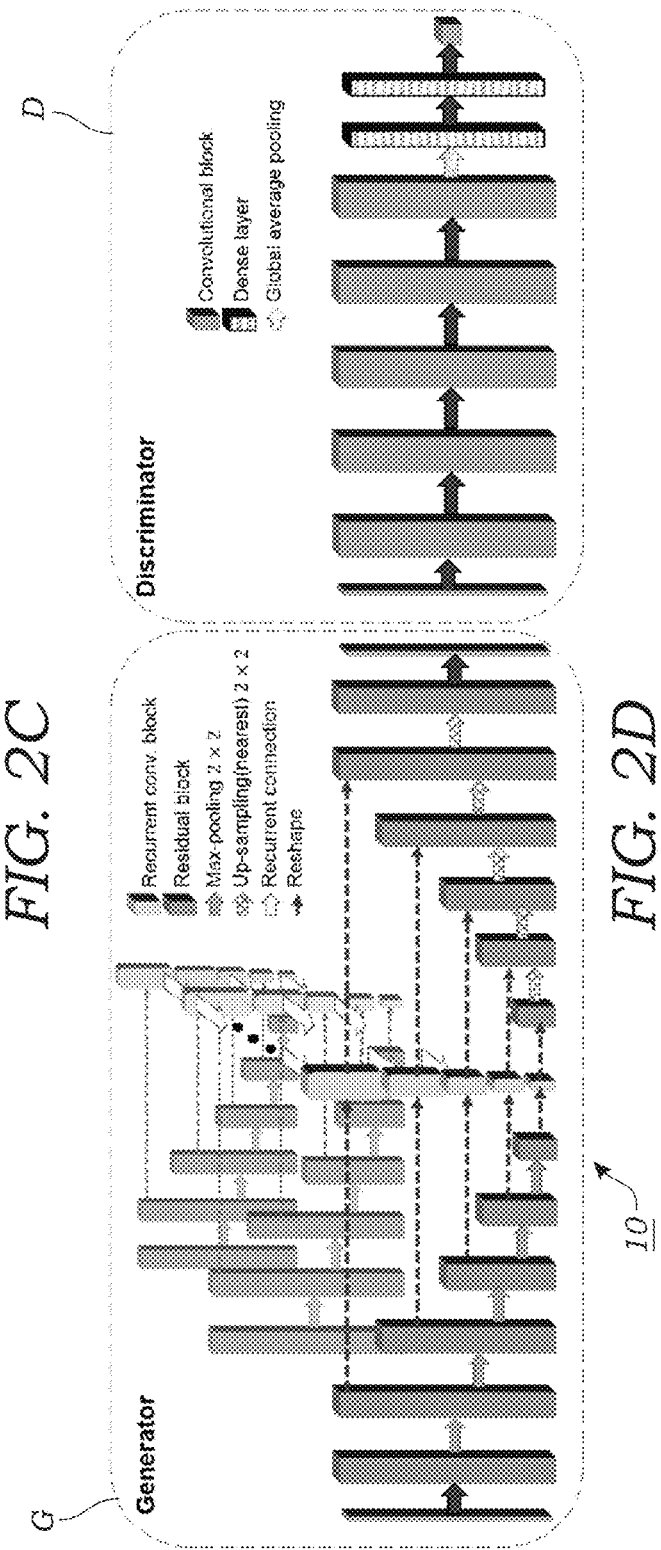
FIG. 2D illustrates the generator structure of the Recurrent-MZ network (left) and the discriminator structure used for training the Recurrent-MZ network (right).

The discriminator (D) (FIG. 2D) is a CNN consisting of five convolutional blocks and two dense layers. The k-th convolutional block has two convolutional layers with $20 \cdot 2^k$ channels. A global average pooling layer compacts each channel before the dense layers. The first dense layer has 20 hidden units with ReLU activation function and the second dense layer uses a sigmoid activation function. The GAN structure and other details of both the generator (G) and discriminator (D) networks are illustrated in FIGS. 2C and 2D.

Recurrent-MZ Implementation

The Recurrent-MZ network 10 was written and implemented using TensorFlow 2.0. In both training and testing phases, a DPM 26 is automatically concatenated with the input image 20 by the data loader, indicating the relative axial position of the input plane to the desired output plane, i.e., the input in the training phase has dimensions of M×256×256×2. Through varying the DPMs 26, Recurrent-MZ learns to digitally propagate inputs to any designated plane, and thus forming an output volume with dimensions of |Z|×256×256.

The training loss of the Recurrent-MZ network 10 is composed of three parts: (i) pixel-wise BerHu loss, (ii) multiscale structural similarity index (MSSSIM), and (iii) the adversarial loss using the generative adversarial network (GAN) structure. Based on these, the total loss of Recurrent-MZ, i.e., $L_V$, is expressed as $$L_V = \alpha \text{BerHu}(\hat{y}, y) + \beta \text{MSSSIM}(\hat{y}, y) + \gamma [D(\hat{y}) - 1]^2 \quad (7)$$

$\hat{y}$ is the output image 22 of the Recurrent-MZ network 10, and y is the ground truth image 28 for a given axial plane. $\alpha$, $\beta$, $\gamma$ are the hyperparameters, which were set as 3, 1 and 0.5, respectively. And the MSSSIM and BerHu losses are expressed as:

$$\text{MSSSIM}(x, y) = \left[\frac{2\mu_{x_M}\mu_{y_M} + C_1}{\mu_{x_M}^2 + \mu_{y_M}^2 + C_1}\right]^{\alpha_M} \cdot \prod_{j=1}^{M} \left[\frac{2\sigma_{x_j}\sigma_{y_j} + C_2}{\sigma_{x_j}^2 + \sigma_{y_j}^2 + C_2}\right]^{\beta_j} \left[\frac{\sigma_{x_j y_j}^2 + C_3}{\sigma_{x_j}\sigma_{y_j} + C_3}\right]^{\gamma_j} \quad (8)$$

$$\text{BerHu}(x, y) = \sum_{\substack{m,n \\ |x(m,n)-y(m,n)| \leq c}} |x(m, n) - y(m, n)| + \sum_{\substack{m,n \\ |x(m,n)-y(m,n)| > c}} \frac{[x(m, n) - y(m, n)]^2 + c^2}{2c} \quad (9)$$

$x_j$, $y_j$ are $2^{j-1}$ down-sampled images of x, y, respectively, $\mu_x$, $\sigma_x^2$ denote the mean and variance of x, respectively, and $\sigma_{xy}^2$ denotes the covariance between x and y. x(m, n) is the intensity value at pixel (m, n) of image x. $\alpha_M$, $\beta_j$, $\gamma_j$, $C_i$ are empirical constants and c is a constant set as 0.1.

The loss for the discriminator $L_D$ is defined as:

$$L_D = \frac{1}{2}D(\hat{y})^2 + \frac{1}{2}[D(y) - 1]^2 \quad (10)$$

where D is the discriminator of the GAN framework. An Adam optimizer with an initial learning rate $10^{-5}$ was employed for stochastic optimization.

The training time on a PC with Intel Xeon W-2195 CPU, 256 GB RAM and one single NVIDIA RTX 2080 Ti graphic card is about 3 days. The reconstruction time using the Recurrent-MZ network 10 (M=3) of a volume of 101×256×256 pixels takes ~2.2 s, and the reconstruction of an output image 22 of 1024×1024 takes ~0.28 s.

The Implementation of Deep-Z

The Deep-Z network, used for comparison purposes, is identical to that disclosed in Wu et al. which is reference herein, and was trained and tested on the same dataset as the Recurrent-MZ network 10 using the same machine. The loss function, optimizer and hyperparameter settings were also identical to Wu et al. Due to the single-scan propagation of Deep-Z, the training range is $$\frac{1}{M}$$

of that of the Recurrent-MZ network 10, depending on the value of M used in the comparison. The reconstructed volumes over a large axial range, as presented in Wu et al., were axially stacked using M non-overlapping volumes, which were propagated from different input scans and covered $$\frac{1}{M}$$

of the total axial range. The Deep-Z reconstruction time for a 1024×1024 output image on the same machine as Recurrent-MZ is ~0.12 s.

The Implementation of 3D U-Net

For each input sequence of M×256×256×2 (the second channel is the DPM), it was reshaped as a tensor of 256× 256×(2M) and fed into the 3D U-Net. When permuting the M input scans, the DPMs 26 always follow the corresponding images/scans. The number of channels at the last convolutional layer of each down-sampling block is $60 \cdot 2^k$ and the convolutional kernel is 3×3×3. The network structure is the same as reported in Ö. Çiçek et al., "3D U-Net: Learning Dense Volumetric Segmentation from Sparse Annotation," in Medical Image Computing and Computer-Assisted Intervention—MICCAI 2016, S. Ourselin, L. Joskowicz, M. R. Sabuncu, G. Unal, and W. Wells, eds., Lecture Notes in Computer Science (Springer International Publishing), Vol. 9901, pp. 424-432 (2016). The other training settings, such as the loss function and optimizer are similar to the Recurrent-MZ network 10. The reconstruction time (M=3) for an output image of 1024×1024 on the same machine (Intel Xeon W-2195 CPU, 256 GB RAM and one single NVIDIA RTX 2080 Ti graphic card) is ~0.2 s, i.e., very similar to Recurrent-MZ network 10 inference time (0.28 sec) for the same inputs.

While embodiments of the present invention have been shown and described, various modifications may be made without departing from the scope of the present invention. The invention, therefore, should not be limited, except to the following claims, and their equivalents.

What is claimed is:

1. A microscopy method comprising:
   providing a trained recurrent neural network that is executed by software using one or more processors;
   inputting to the trained recurrent neural network a plurality of microscopy input images of a sample volume obtained at different axial distances therein, wherein the plurality of input images are each appended with a digital propagation matrix (DPM) that represents, pixel-by-pixel, an axial distance of a user-defined or automatically generated surface within the sample volume from a plane of the corresponding input image; and
   outputting one or more output images of the sample from the trained recurrent neural network that is/are digitally propagated or refocused to the user-defined or automatically generated surface(s) defined by the DPMs.

2. The method of claim 1, wherein a plurality of output images from the trained recurrent neural network are digitally combined to create a volumetric image of the sample.

3. The method of claim 1, wherein a plurality of output images from the trained recurrent neural network are digitally combined to create at least one extended depth of field (EDOF) image of the sample.

4. The method of claim 1, wherein the microscopy input images comprise fluorescence images from a fluorescence microscope and wherein the output images have an improved depth-of-field as compared to the depth-of-field of the fluorescence microscope.

5. The method of claim 1, wherein a plurality of output images from the trained recurrent neural network are digitally combined to create an image of the sample over at least one arbitrary user-defined or automatically generated three-dimensional (3D) surface.

6. The method of claim 1, wherein the recurrent neural network is trained using fluorescence microscopy images along with their corresponding ground truth images and the plurality of microscopy input images that are input to the recurrent neural network are obtained from a fluorescence microscope.

7. The method of claim 1, wherein the plurality of microscopy input images to the trained recurrent neural network are obtained by using one or more of the following types of microscopes: a super-resolution microscope, a STED microscope, a PALM/STORM-based microscope, a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope.

8. The method of claim 1, wherein the plurality of the ground truth images used in the training of the recurrent neural network are obtained by using one or more of the following types of microscopes: a super-resolution microscope, a STED microscope, a PALM/STORM-based microscope a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope.

9. The method of claim 1, wherein the plurality of the ground truth images used in the training of the recurrent neural network and the corresponding input training images are acquired using different types of microscopes and/or different microscopic imaging modalities.

10. The method of any of claim 1, wherein the plurality of the ground truth images used in the training of the recurrent neural network and the corresponding input training images are acquired using the same types of microscopes and/or same microscopic imaging modalities.

11. The method of claim 1, wherein the plurality of microscopy input images of the sample is $\geq 2$ and $\leq 10$ images.

12. The method of claim 1, wherein the trained recurrent neural network is trained using a plurality of ground truth images obtained by mechanically scanning through the same or similar sample(s) at different axial distances, the ground truth images being paired with the corresponding training input images.

13. A system for outputting microscopy images of a sample volume comprising a computing device having image processing software executed thereon, the image processing software comprising a trained recurrent neural network that is executed using one or more processors of the computing device, wherein the trained recurrent neural network is trained using matched pairs of (1) a plurality of images obtained at different axial depths within the sample volume and appended with different digital propagation matrices (DPMs) each of which represents, pixel-by-pixel, an axial distance of a user-defined or automatically generated surface within the sample volume from a plane of the input image, and (2) corresponding ground truth images captured at a correct/target focus depth defined by the corresponding DPM, the trained recurrent neural network configured to receive microscopy input images of the sample appended with a corresponding DPM and outputting one or more output image(s) of the sample from the trained recurrent neural network that are digitally propagated to one or more user-defined or automatically generated surface(s) defined by the appended DPM(s) to the microscopy input images.

14. The system of claim 13, wherein the microscopy input images comprise fluorescence microscopy images and the one or more output image(s) of the sample comprise fluorescence microscopy images.

15. The system of claim 14, wherein the one or more output image(s) comprise a plurality of fluorescence output images from the trained recurrent neural network that are digitally combined to create at least one extended depth of field (EDOF) image of the sample.

16. The system of claim 13, wherein the computing device comprises at least one of a personal computer, a laptop, a tablet, a remote and/or local server, an ASIC, or one or more graphics processing units (GPUs).

17. The system of claim 13, wherein the recurrent neural network is trained using fluorescence microscopy images along with their corresponding ground truth images and the plurality of microscopy input images that are input to the recurrent neural network are obtained from a fluorescence microscope.

18. The system of claim 13, wherein the recurrent neural network is trained with a plurality of microscopy input images obtained from one or more of the following types of microscopes: a super-resolution microscope, a STED microscope, a PALM/STORM-based microscope, a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope.

19. The system of claim 13, wherein the plurality of the ground truth images used in the training of the recurrent neural network are obtained by using one or more of the following types of microscopes: a super-resolution microscope, a STED microscope, a PALM/STORM-based microscope a confocal microscope, a confocal microscope with single photon or multi-photon excited fluorescence, a second harmonic or high harmonic generation fluorescence microscope, a light-sheet microscope, a structured illumination microscope, a TIRF-based microscope, a computational microscope, a ptychographic microscope, an optical coherence tomography (OCT) microscope, or a holographic microscope.

20. The system of claim 13, wherein the plurality of the ground truth images used in the training of the recurrent neural network and the corresponding input training images are acquired using different types of microscopes and/or different microscopic imaging modalities.

21. The system of claim 13, wherein the plurality of the ground truth images used in the training of the recurrent neural network and the corresponding input training images are acquired using the same types of microscopes and/or same microscopic imaging modalities.

* * * * *